US010248747B1

(12) United States Patent
Mukherjee et al.

(10) Patent No.: US 10,248,747 B1
(45) Date of Patent: Apr. 2, 2019

(54) INTEGRATED CIRCUIT SIMULATION WITH DATA PERSISTENCY FOR EFFICIENT MEMORY USAGE

(71) Applicant: Cadence Design Systems, Inc., San Jose, CA (US)

(72) Inventors: Jaideep Mukherjee, San Jose, CA (US); Saibal Saha, San Jose, CA (US); Jianyu Li, Beijing (CN); Yishan Wang, Beijing (CN); Walter J. Ghijsen, San Jose, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 28 days.

(21) Appl. No.: 15/588,113

(22) Filed: May 5, 2017

(51) Int. Cl.
*G06F 17/50* (2006.01)

(52) U.S. Cl.
CPC ........ *G06F 17/5036* (2013.01); *G06F 17/504* (2013.01); *G06F 17/5045* (2013.01); *G06F 2217/12* (2013.01); *G06F 2217/66* (2013.01); *Y02P 90/265* (2015.11)

(58) Field of Classification Search
CPC ............... G06F 17/5036; G06F 17/504; G06F 17/5045; G06F 2217/12; G06F 2217/66; Y02P 90/265
See application file for complete search history.

(56) References Cited

U.S. PATENT DOCUMENTS

| | | | | |
|---|---|---|---|---|
| 6,530,065 | B1 * | 3/2003 | McDonald | G06F 17/5036 716/102 |
| 7,467,333 | B2 * | 12/2008 | Keeton | G06F 11/261 703/21 |
| 7,735,033 | B2 | 6/2010 | Zhang et al. | |
| 8,176,444 | B2 | 5/2012 | Banerjee et al. | |
| 8,195,439 | B1 | 6/2012 | Hussain | |
| 8,260,600 | B1 * | 9/2012 | Deng | G06F 17/5036 703/14 |
| 8,296,691 | B2 | 10/2012 | Chidambarrao et al. | |
| 8,407,646 | B2 | 3/2013 | Chandramohan et al. | |
| 8,453,102 | B1 | 5/2013 | Pack et al. | |
| 8,595,669 | B1 | 11/2013 | Keller et al. | |
| 8,788,995 | B1 * | 7/2014 | Kumar | G06F 17/5031 716/110 |
| 9,031,825 | B1 * | 5/2015 | McGaughy | G06F 17/5022 703/14 |
| 9,639,644 | B1 | 5/2017 | Liu et al. | |

(Continued)

*Primary Examiner* — Helen Rossoshek
(74) *Attorney, Agent, or Firm* — McDermott Will & Emery LLP

(57) ABSTRACT

A method for simulating an integrated circuit (IC) is provided. The method includes parsing an IC and loading the IC into memory and forming a table model including parameter values for at least one circuit component in the IC, the parameter values selected from a portion of a parameter space, storing a data value associated with the parsing of the IC and the table model in a database accessible through a cloud computing environment, the data value comprising a metadata associated with the data value, loading, to a processor, at least one of the data value or the metadata from the database, modifying the data value or the metadata that is loaded in the processor, according to the portion of the parameter space, and performing an analysis on at least one block of the IC according to the data value or the metadata that is loaded in the processor.

20 Claims, 16 Drawing Sheets

(56) References Cited

U.S. PATENT DOCUMENTS

| | | | | |
|---|---|---|---|---|
| 2007/0162268 | A1* | 7/2007 | Kota | G06F 17/5022 703/14 |
| 2009/0307639 | A1* | 12/2009 | Chapman | G06F 17/5045 716/136 |
| 2010/0131249 | A1 | 5/2010 | Homma | |
| 2010/0185431 | A1 | 7/2010 | Kokuda | |
| 2010/0250187 | A1 | 9/2010 | Zuber et al. | |
| 2010/0325593 | A1 | 12/2010 | Zavadsky et al. | |
| 2012/0136633 | A1 | 5/2012 | Xu | |
| 2013/0226535 | A1 | 8/2013 | Tuan | |
| 2013/0325433 | A1* | 12/2013 | Albano | G06F 9/455 703/21 |
| 2015/0020040 | A1 | 1/2015 | Monetti et al. | |
| 2015/0269305 | A1* | 9/2015 | Chen | G06F 17/5081 716/112 |
| 2015/0331981 | A1 | 11/2015 | Mulvaney | |
| 2015/0379174 | A1 | 12/2015 | Chang et al. | |
| 2016/0188762 | A1* | 6/2016 | Warrier | G06F 21/105 703/21 |
| 2017/0122998 | A1 | 5/2017 | Liu et al. | |
| 2017/0315605 | A1 | 11/2017 | Joseph et al. | |
| 2018/0173834 | A1 | 6/2018 | Chollangi et al. | |

* cited by examiner

INTEGRATED CIRCUIT SIMULATION WITH DATA PERSISTENCY FOR EFFICIENT MEMORY USAGE

TECHNICAL FIELD

Embodiments described herein are generally related to the field of circuit simulation in circuit designing and fabrication. More specifically, embodiments described herein are related to memory usage for a large integrated circuit simulation.

BACKGROUND

Simulation and characterization of large integrated circuits (ICs) induces a heavy burden on the memory usage of simulation engines. Consequently, process computation in large IC simulation is scheduled around the availability of memory resources, often slowing down the simulation completion. In many instances, this memory bottleneck is a driving cost of the IC simulation. This limitation becomes more acute in applications where the IC design includes a memory device (e.g., SRAM and the like), where large, mostly repetitive circuit blocks are simulated under multiple conditions and parameters. Typically, multiple circuit blocks in SRAM simulations are treated separately, introducing redundancies in memory usage, ultimately slowing down the simulation pipeline. A slowed simulation reduces turnaround time for IC design, unnecessarily extending the time to market for appliances and devices.

The description provided in the background section should not be assumed to be prior art merely because it is mentioned in or associated with the background section. The background section may include information that describes one or more aspects of the subject technology.

SUMMARY

In a first embodiment, a computer-implemented method for simulating an integrated circuit design is described. The method includes parsing an IC netlist and loading the IC netlist into memory and forming a table model including parameter values for at least one circuit component in the IC netlist, the parameter values selected from a portion of a parameter space. The computer-implemented method further includes storing a data value associated with the parsing of the IC netlist and the table model in a database accessible through a cloud computing environment, the data value comprising a metadata associated with the data value, loading, to a processor, at least one of the data value or the metadata from the database, modifying the data value or the metadata that is loaded in the processor, according to the portion of the parameter space, and performing an analysis on at least one block of the IC netlist according to the data value or the metadata that is loaded in the processor.

In a second embodiment, a system is described that includes a memory, storing instructions, and at least one processor that executes the instructions. When the processor executes the instructions, the system performs steps to parse an IC netlist and loading the IC netlist into memory, form a table model including parameter values for at least one circuit component in the IC netlist, the parameter values selected from a portion of a parameter space, store a data value associated with the parsing of the IC netlist and the table model in a database accessible through a cloud computing environment, the data value comprising a metadata associated with the data value. The memory also includes instructions to load, to the processor, at least one of the data value or the metadata from the database, modify the data value or the metadata that is loaded in the processor, according to the portion of the parameter space, and perform an analysis on at least one block of the IC netlist according to the data value or the metadata that is loaded in the processor.

In yet another embodiment, a non-transitory, machine-readable storage medium is described that includes machine-readable instructions for causing a processor to execute a method. The method includes parsing an IC netlist and loading the IC netlist into memory and forming a table model including parameter values for at least one circuit component in the IC netlist, the parameter values selected from a portion of a parameter space. The computer-implemented method further includes storing a data value associated with the parsing of the IC netlist and the table model in a database accessible through a cloud computing environment, the data value comprising a metadata associated with the data value, loading, to a processor, at least one of the data value or the metadata from the database, modifying the data value or the metadata that is loaded in the processor, according to the portion of the parameter space, and performing an analysis on at least one block of the IC netlist according to the data value or the metadata that is loaded in the processor.

In a further embodiment, a system is described that includes a means for storing instructions and a means to execute the instructions to perform steps to parse an IC netlist and loading the IC netlist into memory, form a table model including parameter values for at least one circuit component in the IC netlist, the parameter values selected from a portion of a parameter space, store a data value associated with the parsing of the IC netlist and the table model in a database accessible through a cloud computing environment, the data value comprising a metadata associated with the data value. The means for storing instructions also includes instructions to load, to the processor, at least one of the data value or the metadata from the database, modify the data value or the metadata that is loaded in the processor, according to the portion of the parameter space, and perform an analysis on at least one block of the IC netlist according to the data value or the metadata that is loaded in the processor.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
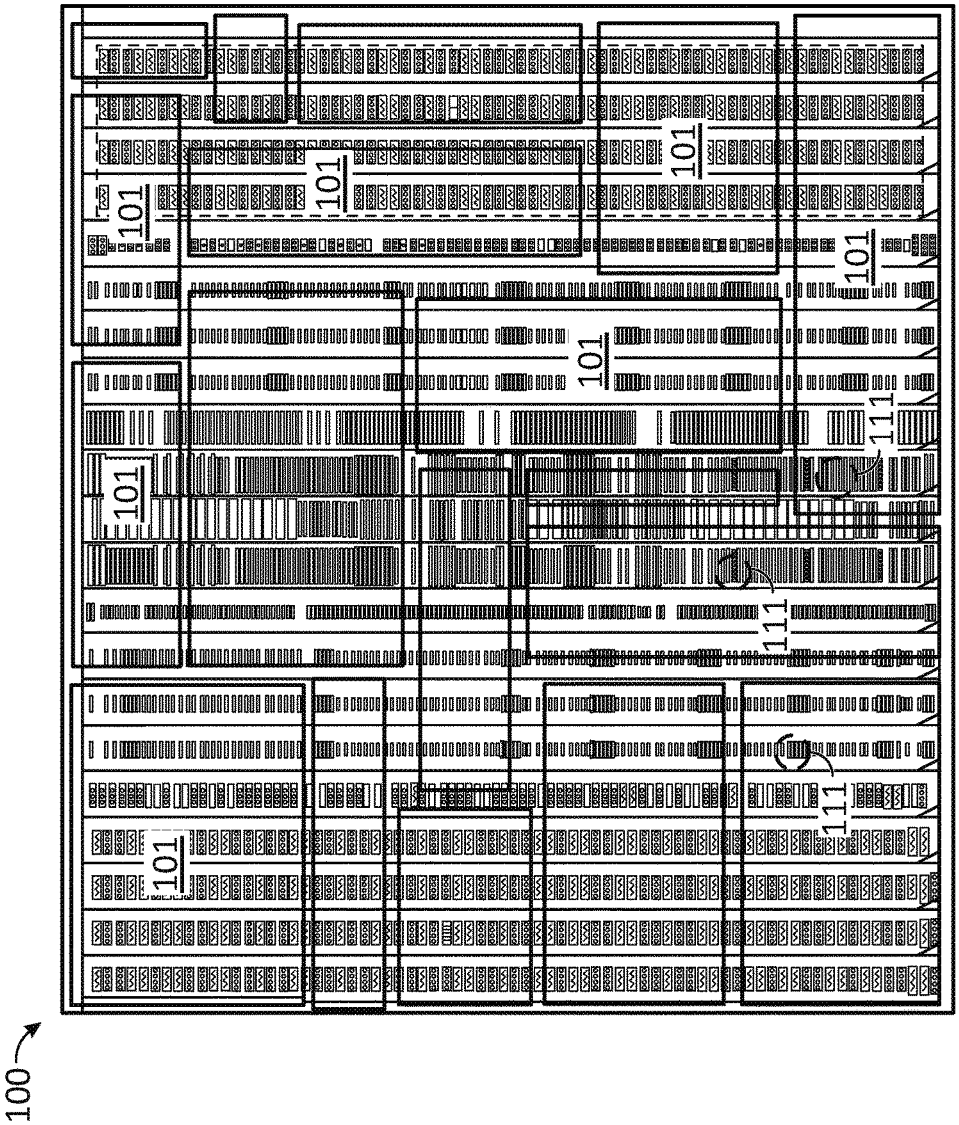
FIG. 1 illustrates a partition of an IC netlist, according to some embodiments.

In the figures, elements and steps denoted by the same or similar reference numerals are associated with the same or similar elements and steps, unless indicated otherwise. In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides a method for simulating an IC designing with minimal memory load on the simulation engine by aggregating the desired circuit modifications at a granular level, while sharing common characteristics at a higher partition level.

The disclosed system addresses a technical problem tied to computer technology and arising in the realm of computer networks, namely the technical problem of memory overload in IC simulation. The disclosed system solves this problem by sharing IC netlists across separate simulation flows, tool modes, and portions of a parameter space (e.g., parameter space corners). Thereafter, transient simulation is performed on slightly modified designs at a granular level, amortizing the cost of setting up a design task. In that regard, some embodiments include the sharing of "direct current" (DC) tables, capacitance-resistance reduction (RCR) steps, and netlist partitioning including data or attributes between multiple tasks, thereby improving simulation performance and speed.

Embodiments as disclosed herein may interact with a compiler to handle data preparation and storage for timing characterization and power characterization for multiple parameter space corners, maximizing the amount of memory sharing between at least one or more of these processes. Accordingly, embodiments consistent with the present disclosure have an impact on the memory footprint and data persistency (through sharing and re-use) of an IC simulation.

Some embodiments include "fork" commands in the compiler (e.g., to create new processes in the IC simulation engine) to parallelize the transient analysis on a standalone computer, achieving linear scaling for each variation in the design (e.g., according to a different portion of the parameter space). Further simulation stages create binary files stored in an ordered stack, the binary files including parameter values and variations of these values. A new simulation may thus be quickly started using these binary files. Some embodiments further include distributed task schedulers to handle multiple portions of the parameter space simultaneously, or almost simultaneously.

In some embodiments, a reduction of 50% or more of memory usage may be obtained by aggregating the variations for the same design with the binary files in an ordered-stack. Some embodiments implement the above solutions in a memory compiler configured to operate in a cloud computing environment to leverage new process flows.

Characterizing memory designs involves multiple simulations for a subset of netlists where most of the netlists are identical. Typically, there are few minor changes in parameter values such as the slew rate, a capacitive load, stimuli, and selected portions of the parameter space ("corners"). Today separate, independent simulations are run for the different portions of the parameter space without sharing memory resources. Accordingly typical simulation schemes repeat the same algorithms to setup the design, e.g., for transient simulation, applying unnecessary traversals to ensure that parameter changes are propagated accurately. For large post layout cases the cost to setup the design can be over 50% of the total cost of running the simulation engine.

FIG. 1 illustrates a partition of an IC netlist 100 into multiple sub-netlists 101, according to some embodiments. IC netlist 100 represents an IC design including multiple components 111 that may include transistors, resistors, capacitors, inductors, and the wires coupling them. As a non-limiting example, components 111 may include metal-oxide-semiconductor (MOS) transistors such as N-type MOS (NMOS) transistors, P-type MOS (PMOS) transistors, field-effect transistors (FET), fin FET transistors (FinFET), and the like. Each partition 101 includes multiple components 111. In some embodiments, adjacent and non-adjacent partitions 101 may be coupled through wires carrying data, timing and synchronization signals (e.g., clocks, latches and the like), power, or any combination of the above.

Figure 2A:
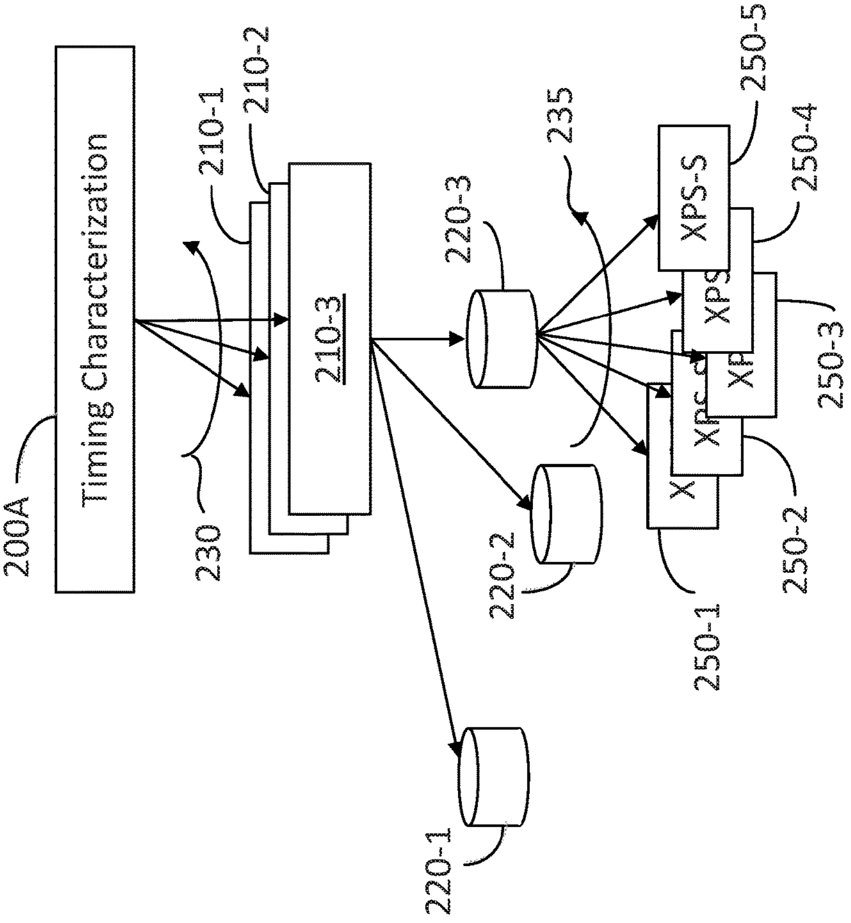
FIG. 2A is a block diagram illustrating an IC simulation engine for timing characterization, according to some embodiments.

FIG. 2A is a block diagram illustrating an IC simulation engine for timing characterization 200A, according to some embodiments. Timing characterization 200A, includes forming partitions 210-1, 210-2, and 210-3 (hereinafter, collectively referred to as "partitions 210") of an IC netlist (e.g., IC netlist 100) according to different parameter space corners 230. Accordingly, multiple sub-netlists 220-1, 220-2 and 220-3 (hereinafter, collectively referred to as "sub-netlists 220") are created (e.g., sub-netlists 101). For each sub-netlist 220, a new set of parameter space sub-portions 235 (e.g., "sub-corners") may be used to perform simulations using either one of simulation tools (e.g., "solvers") 250-1 through 250-5, hereinafter collectively referred to as "solvers 250."

Figure 2B:
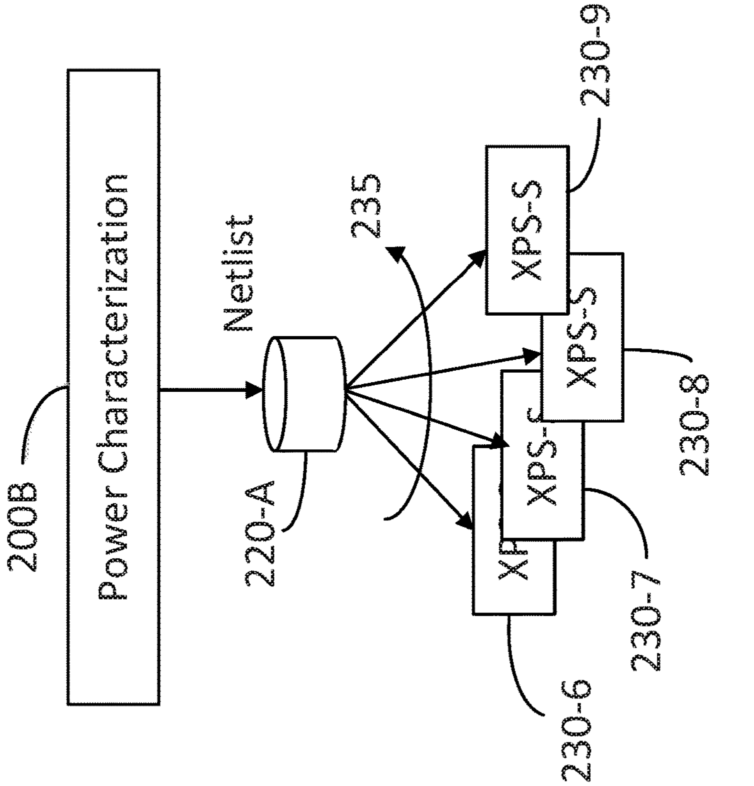
FIG. 2B is a block diagram illustrating an IC simulation engine for power characterization, according to some embodiments.

FIG. 2B is a block diagram illustrating an IC simulation engine for power characterization 200B, according to some embodiments. The configuration of the IC simulation engine for power characterization 200B is similar to that of timing characterization 200A, except that power characterization 200B may be carried out through the entire netlist 220-A, rather than separately for each of sub-netlists 220-1 through 220-3.

In timing characterization 200A or power characterization 200B, parameter space portions 230 and sub-portions 235 may include, for example parameter space corners selected, e.g., according to process, voltage and temperature (PVT) conditions. In some embodiments, different PVT conditions are determined from different versions of the IC design released by the foundry to capture manufacturing variations. Sub-portions 235 may include the same netlist for different corners, such as a "fast" operational corner (e.g., high frequency) and a "slow" operational corner (e.g., low frequency). During characterization, various corners and PVT conditions are tested to ensure that the IC design works as specified.

Figure 3:
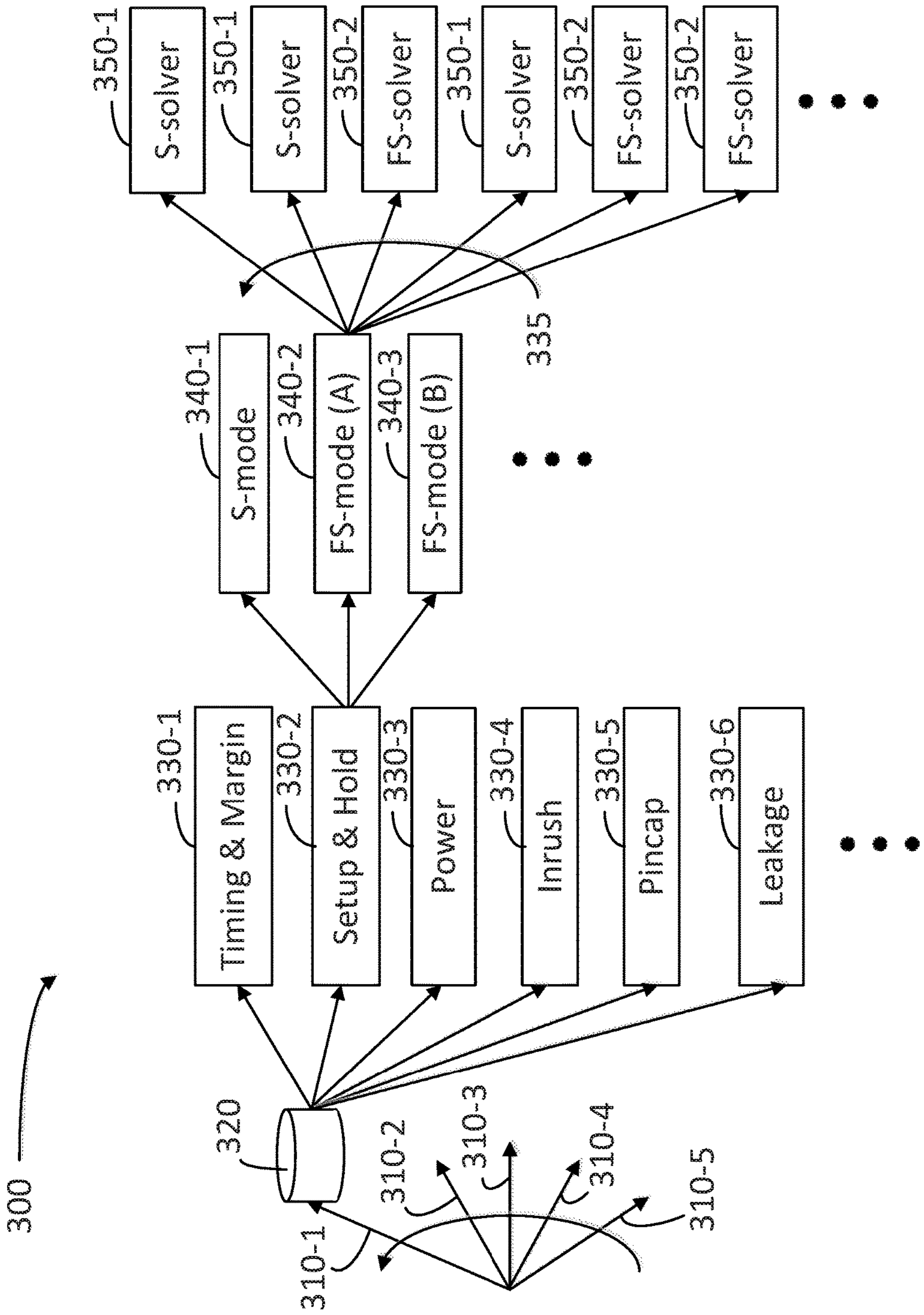
FIG. 3 is a block diagram illustrating an IC simulation engine for multiple instances of an IC netlist, according to some embodiments.

FIG. 3 is a block diagram illustrating an IC simulation engine 300 for multiple instances 310-1 through 310-5 (hereinafter, collectively referred to as instances 310) of an IC netlist 320, according to some embodiments. In some embodiments, the IC simulation engine 300 includes a memory compiler or a memory characterization tool (e.g., for an SRAM design). For each of instances 310, different process flows may include a "Timing & Margin" stage 330-1, a "Setup & Hold" stage 330-2, a "Power" stage 330-3, an "Inrush" stage 330-4, a "Pincap" stage 330-5, and a "Leakage" stage 330-6 (hereinafter, collectively referred to as stages 330). More generally, stages 330 include measurements performed on certain IC designs (e.g., SRAM designs) as part of characterizing the memory.

Further, for each stage 330, a simulation mode may include a tradeoff between accuracy and performance (e.g., simulation speed). Accordingly, a very accurate (albeit slower) solver in "spice" (S) mode 340-1, may be selected over a faster (yet less accurate) solver in "fast spice" FS) mode (e.g., in sub-partition A) 340-2, (e.g., in sub-partition B). In some embodiments, a faster solver can be used with little accuracy loss, while for embodiments including accurate simulations, a spice mode may be used. Solver modes 340-1 and 340-2 will be collectively referred to, hereinafter, as simulation modes 340. Simulation modes 340 may also assign different solvers XPS-S 350-1 or XPS-FS 350-2 (hereinafter, collectively referred to as solvers 350), for each of simulation modes 340, according to the portions of the parameter space assigned to a specific task.

IC simulation engine 300 introduces a modular and accessible reuse of netlist and sub-netlist configuration settings (e.g., parameter values in different parameter space corners) for different process flows 330, different tool modes 340, and different portions of the parameter space 335.

Figure 4A:
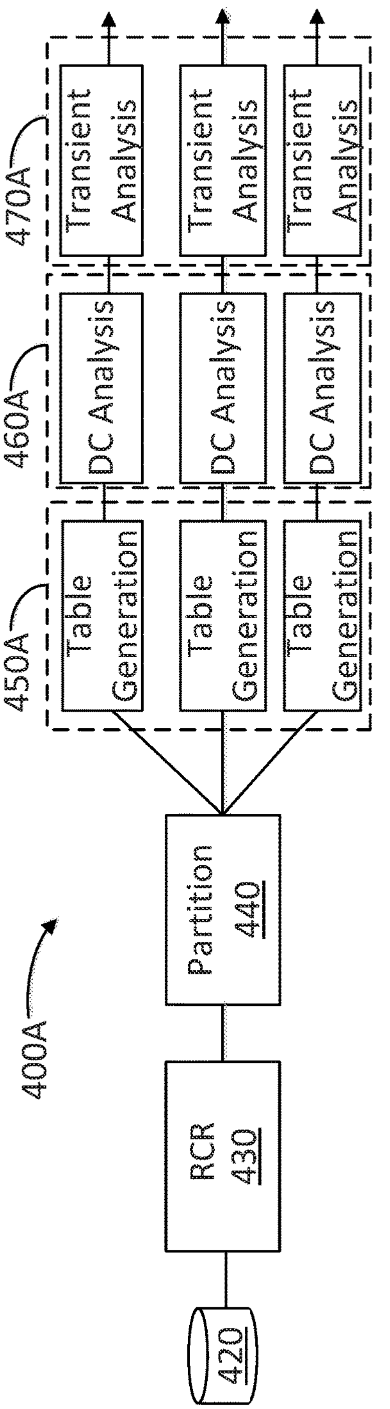
FIG. 4A is a block diagram illustrating steps in an IC simulation using an on stack evaluation flow in a variability analysis, according to some embodiments.

FIG. 4A is a block diagram illustrating steps in an IC simulation using an on-stack evaluation flow 400A in a variational analysis, according to some embodiments. An IC netlist 420 is received and an RCR 430 analysis is performed, followed by a partition 440. Multiple tables are prepared for the unique MOSFETs in table generation steps 450A (hereinafter collectively referred to as "table generation 450") for each parameter space corner. The tables combine values of the different parameters that will be tested in the simulation, e.g., transistor effective channel length ($L_{eff}$), transistor effective channel width ($W_{eff}$), transistor threshold voltage ($V_t$), transistor oxide thickness ($t_{ox}$), saturation carrier speed ($\nu_{sat}$), carrier mobility ($\mu_o$), and the like), selected from each portion of the parameter space. A DC-Analysis 460A is followed by a transient analysis 470A. The DC and transient analysis are done on the IC netlist or design. The tables are used to lookup the values during DC and transient. The reason for the tables is to improve the performance of the DC and transient analysis.

On stack evaluation flow 400A ensures that RCR 430 and partition 440 share the same input file attributes and data values, while table generation is stacked separately, assigning different sets of values (e.g., $L_{eff}$, $W_{eff}$, $V_t$, $t_{ox}$, $\nu_{sat}$, $\mu_o$) according to different portions of the parameter space. Accordingly, overall memory allocations in on-stack evaluation flow 400A eliminates the repetition of registers for RCR 430 and partition 440 for each of the different parameter space corners in table generation 450.

Figure 4B:
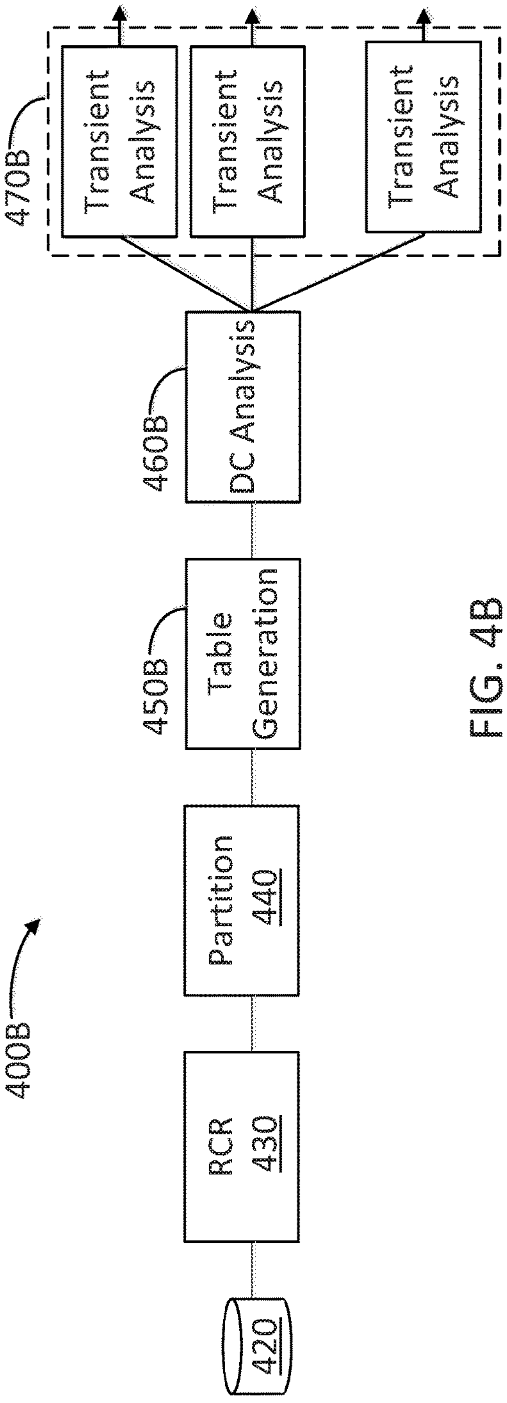
FIG. 4B is a block diagram illustrating steps in an IC simulation using on stack evaluation, according to some embodiments.

FIG. 4B is a block diagram illustrating steps in an IC simulation with an on-stack evaluation flow 400B split at a transient analysis, according to some embodiments. Accordingly, RCR 430 is performed on netlist 420, followed by partition 440, table generation 450B and DC analysis 460B. The variation in the different parameter space corners is introduced in transient analysis 470B for a narrower set of parameters e.g., $V_t$, and transistor drain-source current ($I_{DS}$). In some embodiments, the new set of parameters (e.g., $V_t$ and $I_{DS}$) are stored separately as a ratio on top of the table design for each instance of the circuit element (e.g., a MOSFET). Thus, table designs can be shared between different partitions 440. Accordingly, on stack evaluation flow 400B ensures that RCR 430, partition 440, table generation 450B, and DC analysis 460B share the same input file attributes and data values, while transient analysis 470B is stacked separately for the different values of variables $V_t$ and $I_{DS}$. Accordingly, on-stack evaluation flow 400B avoids rebuilding table designs for transient analysis processes that share the same portion of the parameter space.

On-stack evaluation flows 400A and 400B enable the reuse of parameter values through table generation steps 450A and 450B in a variational designing of an IC netlist. Accordingly, by providing access to the tabulated parameter values at different stages of the simulation, on-stack evaluation flows 400A and 400B substantially reduce memory usage constraints for the IC simulation engine.

Figure 5A:
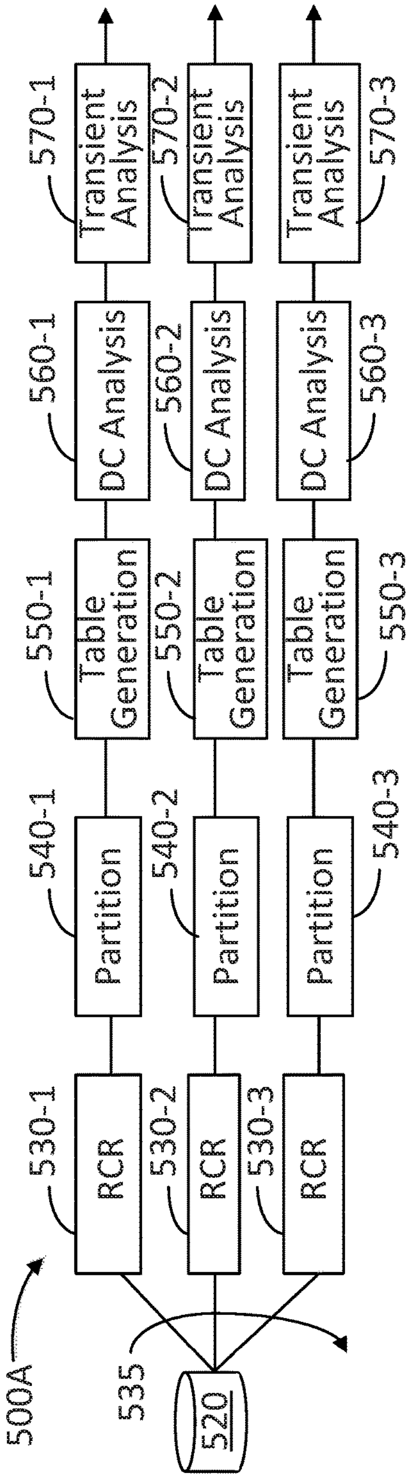
FIG. 5A is a block diagram illustrating steps in an IC simulation including parameter space corner calculations, according to some embodiments.

FIG. 5A is a block diagram illustrating steps in an IC simulation 500A including parameter space corner calculations 535, according to some embodiments. An IC netlist 520 is provided, and a first flow sequence associated with a first parameter space corner includes RCR 530-1, partition 540-1, table generation 550-1, DC analysis 560-1, and transient analysis 570-1, as described above. The first flow sequence may include running an solver in a first mode (e.g., FS solver 350-2). A second flow sequence associated with a second parameter space corner includes RCR 530-2, partition 540-2, table generation 550-2, DC analysis 560-2, and transient analysis 570-2, as described above. The second flow sequence may include running a simulation solver in a second mode (e.g., S solver 350-1). A third flow sequence associated with a third parameter space corner includes RCR 630-3, DC analysis 560-3, and transient analysis 570-3, as described above. The third flow sequence may include running an FS solver. In some embodiments, when some or multiple of the tables generated in steps 550-1, 550-2, and 550-3 include similar data, embodiments as disclosed herein re-use some of the shared data, as will be discussed below in reference to IC simulation 500B.

Figure 5B:
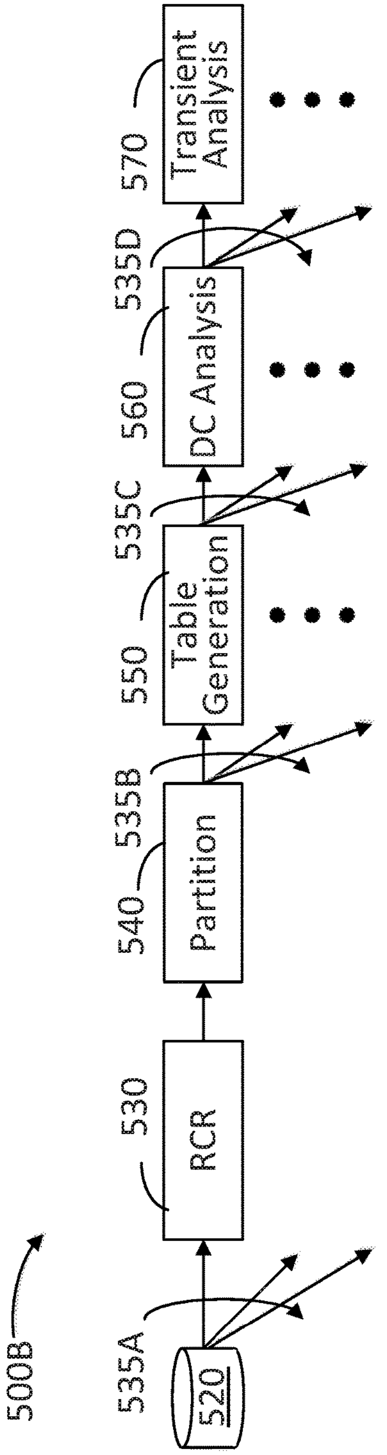
FIG. 5B is a block diagram illustrating steps in an IC simulation including an optimized flow within the IC simulation engine to perform calculations in multiple parameter space corners, according to some embodiments.

FIG. 5B is a block diagram illustrating steps in an IC simulation 500B including an optimized flow within the IC simulation engine to perform calculations in multiple parameter space sub-corners 535A, 535B, 535C, and 535D, (hereinafter, collectively referred to as "sub-corner 535") according to some embodiments. Upon receipt of netlist 520, at each step IC simulation 500B branches into a different corner subset 535 of a parameter space portion. For example, RCR 530 and a partition 540 are performed for each combination of parameters in corner subset 535A. In turn, for each RCR 530 and partition 540, and for each combination of parameters in corner subset 535A, a table generation 550 is carried out for each combination of parameters in corner subset 535B. Likewise, for each RCR 530, partition 540, and table generated 550 with parameters in corner subsets 535A and 535B, a DC analysis 560 is carried out for each combination of parameters in corner subset 535C. And for each RCR 530, partition 540, table generated 550, and DC analysis 560 with parameters in corners 535A, 535B, and 535C, a transient analysis 570 is carried out for each group of parameters in corner 535D.

IC simulation 500B groups multiple portions of the parameter space into a meta-simulation that substantially reduces the usage of memory resources in the IC simulation engine. In some embodiments, IC simulation 500B may be applied in a cloud computing environment. In some embodiments, IC simulation 500B may be applied in a simulation engine running a standalone compiler (e.g., in a benchmark analysis, or during IC design). In some embodiments, IC simulation 500B may be applied in a variational analysis for a Monte-Carlo simulation of IC netlist 520. More specifically, some embodiments as disclosed herein include IC simulation 500B for a memory characterization tool (e.g., for SRAM design).

Figure 6:
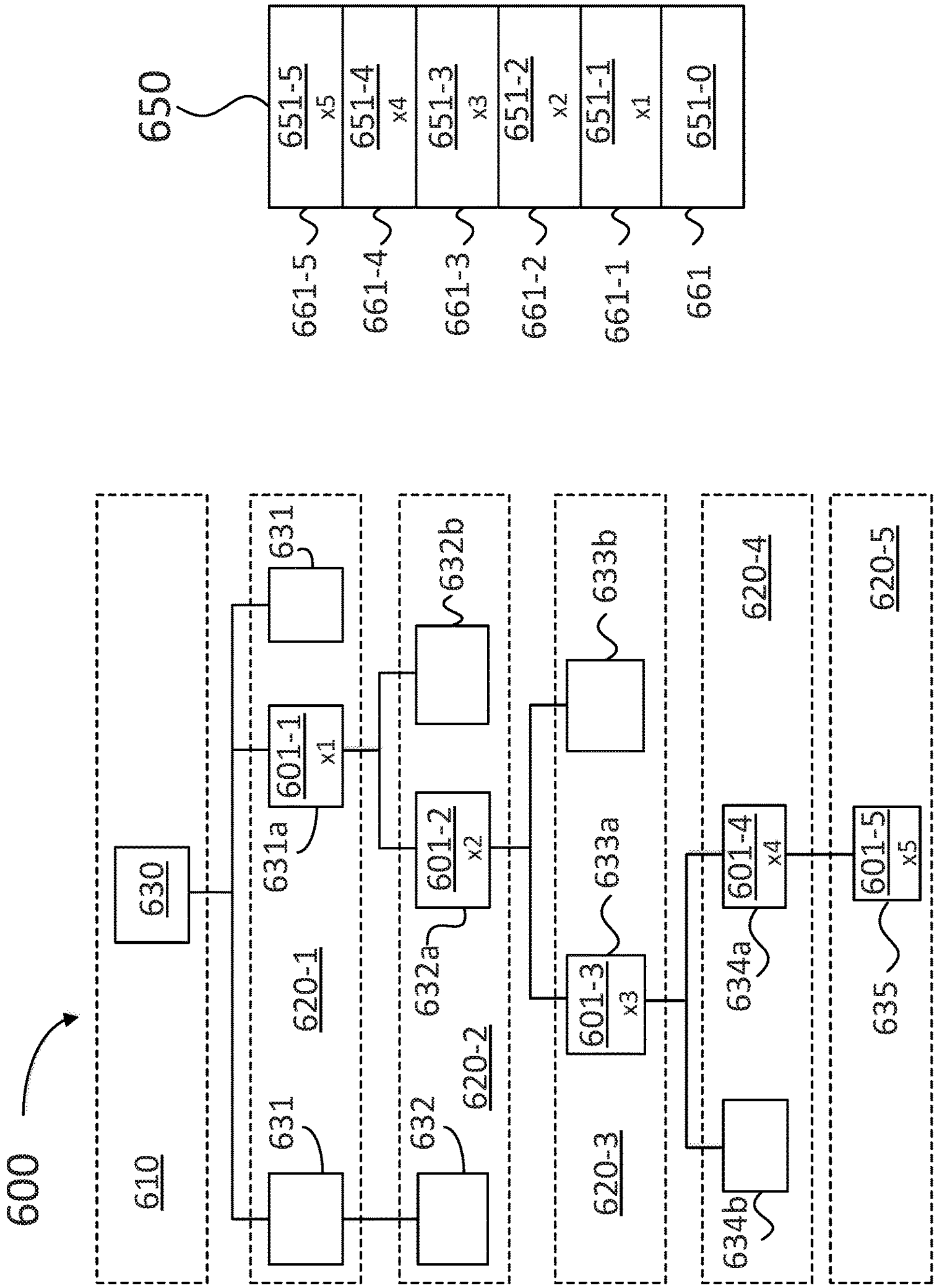
FIG. 6 is a block diagram of a circuit hierarchy for an on-stack evaluation flow, according to some embodiments.

FIG. 6 is a block diagram of a circuit hierarchy 600 and an ordered parameter stack 650 for an on-stack evaluation flow, according to some embodiments. Circuit hierarchy 600 includes a top layer 610, and subsequent process layers 620-2, 620-3, 620-4, and 620-5 (hereinafter, collectively referred to as "layers 620"). Layers 610 and 620 are arranged hierarchically according to a processing sequence and data flow in the sub-circuits defined in the IC netlist (e.g., blocks and sub-netlists). Top layer 610 includes a top node 630 that represents the IC netlist (e.g., IC netlist 100, 420, or 520). Each of process layers 620 includes at least one or more nodes of an IC sub-netlist (e.g., sub-netlists 101 or 220) that is part of the IC netlist. Accordingly, top layer 610 includes node 631 for the IC netlist. Layer 620-1 includes nodes 631 and 631*a* for sub-netlists of at least some of IC netlist in top layer 610. Layer 620-2 includes nodes 632, 632*a* and 632*b* for sub-circuits of at least some of the sub-netlists in layer 620-1. Layer 620-3 includes nodes 633*a* and 633*b* for sub-circuits of at least some of the sub-circuits in layer 620-2. Layer 620-4 includes nodes 634*a* and 634*b* for sub-circuits of at least some of the sub-circuits in layer 620-3, and layer 620-5 includes node 635 for sub-circuits of at least some of the sub-circuits in layer 620-4.

In some embodiments, the IC simulation engine handles one hierarchical stack of parameter values at a time. Accordingly, in some embodiments the IC simulation engine first selects and handles top node 630 in layer 610, selects a value x1 for node 631*a* of parameter x in layer 620-1 (instance 601-1), selects a value x2 for node 632*a* of parameter x in layer 620-2 (instance 601-2), selects a value x3 for node 633*a* of parameter x in layer 620-3 (instance 601-3), selects a value x4 for node 634*a* of parameter x in layer 620-4 (instance 601-4), and selects a value x5 for node 635 of parameter x in layer 620-5 (instance 601-5). Then, the IC simulation engine goes back up the stack to layer 620-1 and selects the next node (e.g., 631) of parameter x, repeating the above process down the hierarchy. Instances 601-1 through 601-5 will be referred to collectively, hereinafter, as "instances 601."

The IC simulation engine stores value, 661-1 (x1), for parameter x, in register 651-1 of ordered parameter stack 650. Further down circuit hierarchy 600, in layer 620-2, node 632*a* may assign a modified value 661-2 (x2) for parameter x in sub-circuit 601-2. Accordingly, the IC simulation engine stores x2 661-2 in register 651-2 of ordered parameter stack 650. The IC simulation engine stores value, 661-3 (x3), for parameter x, in register 651-3 of ordered parameter stack 650. In layer 620-4, node 634*a* may further assign modified value 661-4 (x4) for parameter x in instance 601-4. Accordingly, the IC simulation engine stores x4 661-4 in register 651-4 of ordered parameter stack 650. In layer 620-5, node 635 may further assign modified value 661-5 (x5) for parameter x in instance 601-5. Accordingly, the IC simulation engine stores x5 661-5 in register 651-5 of ordered parameter stack 650.

In some embodiments, circuit hierarchy 600 and ordered parameter stack 650 may be used as described above for a variation analysis wherein, for example, each transistor stores a unique parameter value. Accordingly, the parameter, x, may be a transistor property (e.g., $L_{eff}$, $W_{eff}$, $V_t$, $t_{ox}$, $v_{sat}$, $\mu_o$, and the like) that is modified according to the simulation characteristics of the different sub-circuits where the transistor may be located in the IC netlist. Therefore, ordered parameter stack 650 allows for a user to access the value of a device parameter at a precise level of granularity for the task at hand. In some embodiments, the simulation engine synchronizes stored parameter values 651 in with circuit hierarchy 600. Furthermore, an IC simulation engine using a storage architecture with circuit hierarchy 600 and ordered parameter stack 650 has the advantage that parameter values 651 are updated only once for the changes to be effected to all related nodes down the hierarchy tree. This configuration frees memory resources at the higher layers in circuit hierarchy 600, enabling the parallel processing of multiple tasks across the same layer, which may share the same or similar parameter values.

Accordingly, ordered parameter stack 650 caches some dependency for what parameters will be modified during a process flow, thereby speeding up the simulation process to focus only on what has been modified.

Figure 7:
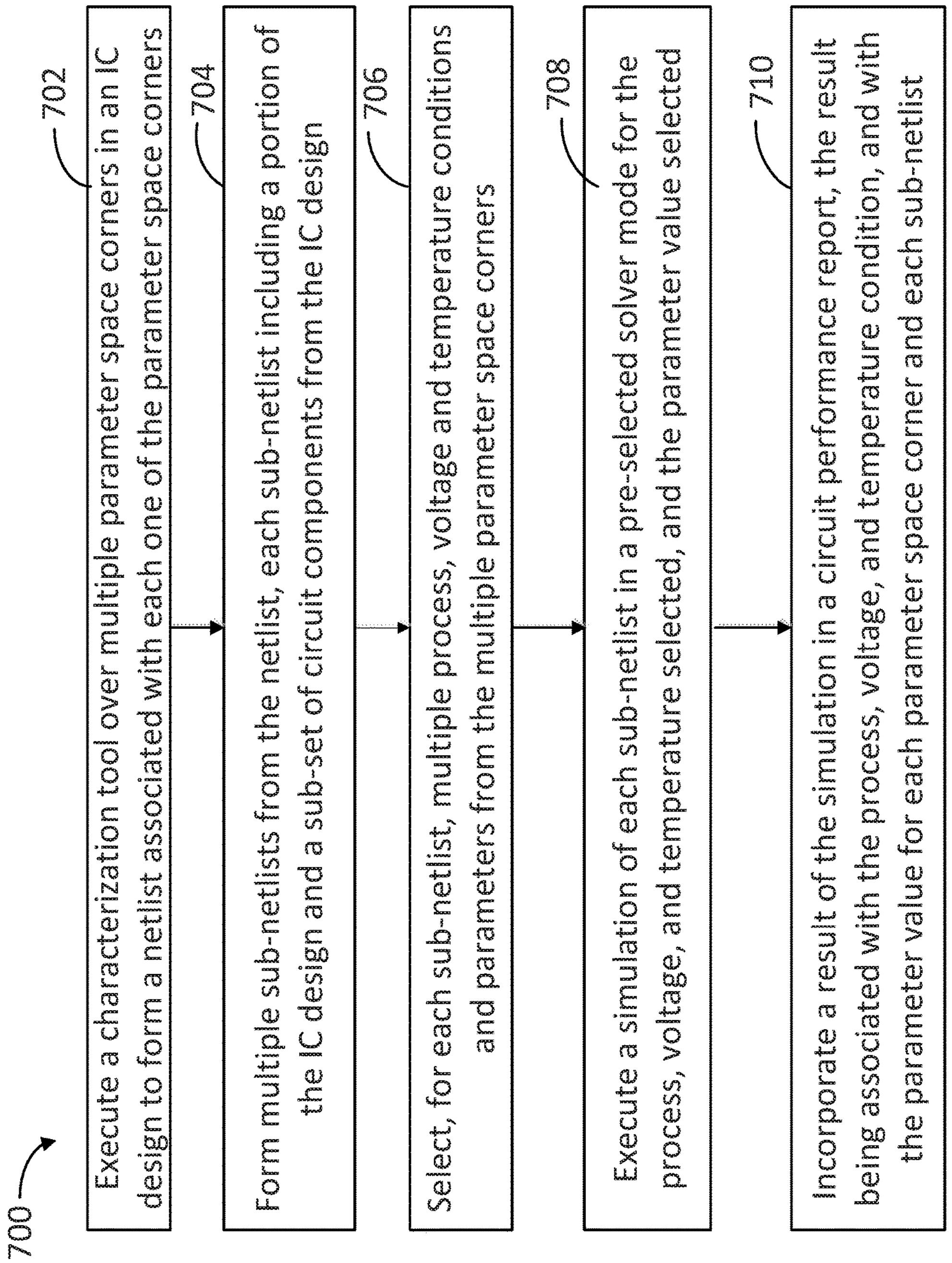
FIG. 7 is a flow chart illustrating steps in a method of characterizing an IC design, according to some embodiments.

FIG. 7 is a flow chart illustrating steps in a method 700 for storing and reading data from a circuit hierarchy to uniquely reference each instance of the circuit (e.g., instances 601). At least some of the steps in method 700 may be performed by a computer having a processor executing commands stored in a memory of the computer. Further, steps as disclosed in method 700 may include retrieving, editing, and/or storing files in a database that is part of, or is communicably coupled to, the computer. Methods consistent with the present disclosure may include at least some, but not all of the steps illustrated in method 700, performed in a different sequence. Furthermore, methods consistent with the present disclosure may include at least two or more steps as in method 700, performed overlapping in time, or almost simultaneously.

Step 702 includes executing a characterization tool over multiple parameter space corners in an IC design to form a netlist associated with each one of the parameter space corners. In some embodiments, step 702 includes at least one of executing a timing characterization or a power characterization of the circuit design over the first corner of the parameter space.

Step 704 includes forming multiple sub-netlists (e.g., sub-netlists 101 and 220) from the netlist, each sub-netlist including a portion of the circuit design and a sub-set of circuit components from the IC design. In some embodiments, step 704 may include executing a simulation solver (e.g., an FS-solver or an S-solver) on the netlist to monitor a sensitivity between at least two separate blocks in a partition of the netlist. For example, in some embodiments step 704 may include performing an FS-solver simulation to verify that an output in one sub-netlist 101 selected according to a partition of IC netlist 100 does not affect an input in a different sub-netlist 101 from the same partition of IC netlist 100.

Step 706 includes selecting, for each sub-netlist, multiple process, voltage and temperature conditions and parameters from the multiple parameter space corners. In some embodiments, step 706 includes selecting a process for characterizing a memory circuit. In some embodiments, step 706 includes selecting a condition from one of a process, a voltage, or a temperature condition comprises selecting the process, the voltage, and the temperature conditions for which a lower circuit performance is expected. In some embodiments, step 706 further includes selecting a second parameter from the first portion of the parameter space when the result of the simulation comprises a performance value below or above a pre-selected circuit specification.

Step 708 includes executing a simulation of each sub-netlist in a pre-selected solver mode (e.g., a slow S-mode, or a fast, FS-mode) for the process, voltage, and temperature selected, and for the parameter value selected. In some embodiments, step 708 includes selecting at least one of a signal delay, a leakage current, a slew rate, a capacitance, a loading or a threshold voltage of a transistor from the first portion of the parameter space. In some embodiments, step 708 includes selecting a fast solver mode or an accurate solver mode based on a desired performance and accuracy of the simulation for the sub-netlist.

Step 710 includes incorporating a result of the simulation in a circuit performance report, the result being associated with the process, voltage, and temperature condition, and with the parameter value selected for each sub-netlist.

In some embodiments, step 710 includes forming a second sub-netlist comprising a different portion of the circuit design comprising different circuit components from the first sub-netlist. Further, in some embodiments step 710 includes incorporating a second result of a second simulation of the second sub-netlist in the circuit performance report, the second simulation executed with a selected solver mode using the condition and at least a second parameter selected from the parameter space corner.

In some embodiments, method 700 includes executing the characterization tool over a second parameter space corner in step 702, and including a result from a second simulation in a circuit performance report in step 710, wherein the second simulation is associated with at least one parameter selected from the second parameter space corner.

Figure 8:
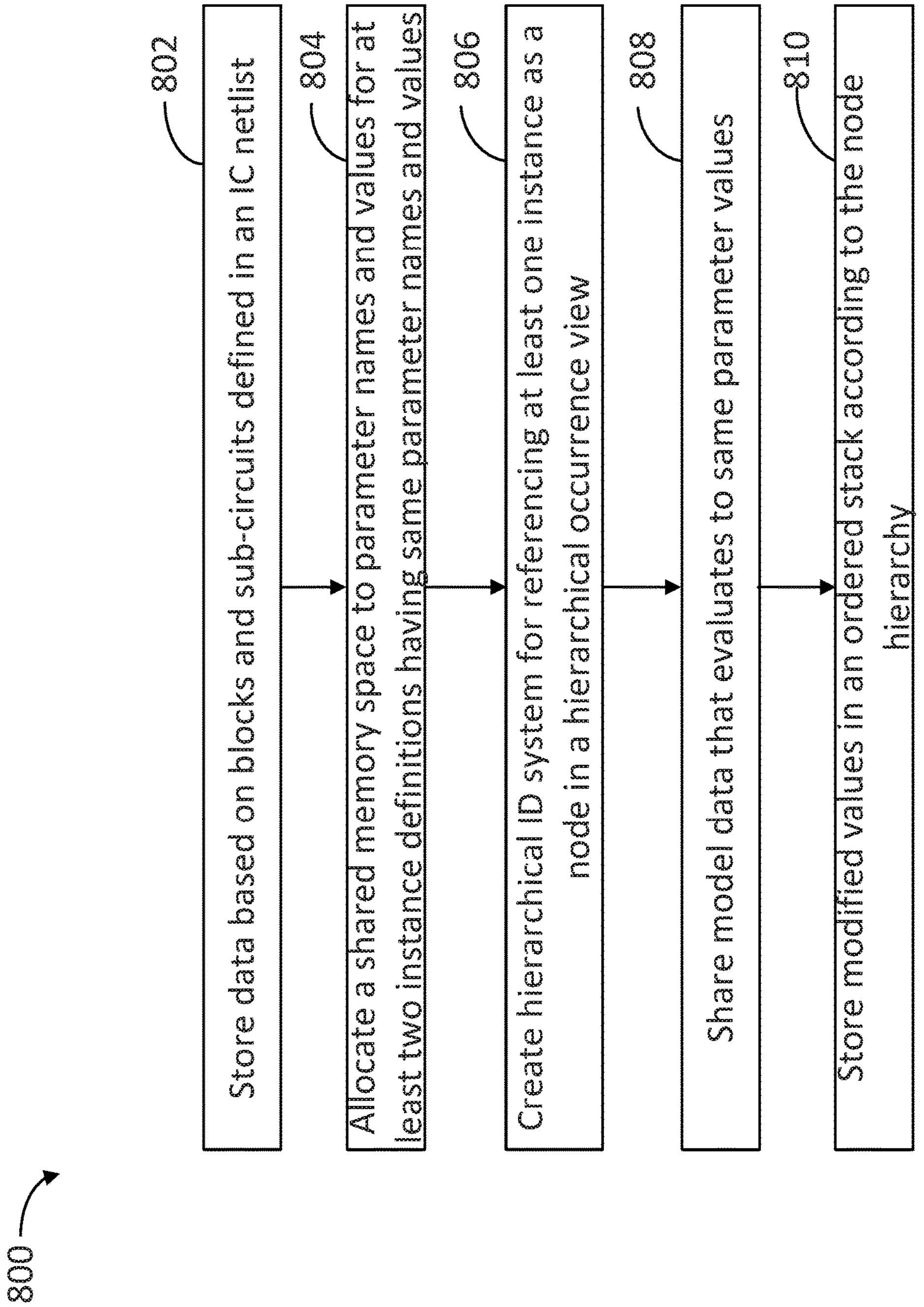
FIG. 8 is a flow chart illustrating steps in a method for storing and reading data from a circuit hierarchy to uniquely reference each instance of an IC netlist.

FIG. 8 is a flow chart illustrating steps in a method 800 for storing and reading data from a circuit hierarchy to uniquely reference each instance of the circuit (e.g., instances 601). At least some of the steps in method 800 may be performed by a computer having a processor executing commands stored in a memory of the computer. Further, steps as disclosed in method 800 may include retrieving, editing, and/or storing files in a database that is part of, or is communicably coupled to, the computer. Methods consistent with the present disclosure may include at least some, but not all of the steps illustrated in method 800, performed in a different sequence. Furthermore, methods consistent with the present disclosure may include at least two or more steps as in method 800, performed overlapping in time, or almost simultaneously.

In some embodiments, at least one or more of the steps in method 800 may be performed in a cloud computing environment, wherein the computer may include servers, such as a master server and a slave server. Accordingly, at least some of the steps illustrated in method 800 may be performed in parallel in different processors, following separate computational threads. For example, each of the separate computational threads may be performed by at least one of slave servers in each applications and processors dedicated to the specific computational thread. Furthermore, a first processor may partially perform at least one of the steps of method 800 in a first computational thread and a second processor may partially perform at least a second one of the steps of method 700 in a second computational thread.

In some embodiments, methods consistent with method 800 include an IC netlist partitioned into multiple sub-netlists, and a database with a stack of memory registers ordered according to a circuit hierarchy (e.g., IC netlists 100, 420 and 520, sub-netlists 101, and 220, circuit hierarchy 600, and ordered stack 650).

Step 802 includes storing data based on blocks and sub-circuits defined in the IC netlist.

Step 804 includes allocating a shared memory space to parameter names and values for at least two instance definitions having the same parameter names and values.

Step 806 includes creating a hierarchical identification system for referencing each instance as a node in a hierarchical occurrence view.

Step 808 includes sharing design data that evaluates to same parameter values. In some embodiments, step 808 includes sharing the design data across multiple nodes in the hierarchical view: along the same hierarchical level, between at least two different hierarchical levels, globally between all nodes.

Step 810 includes storing modified values in an ordered stack according to the node hierarchy. Accordingly, in some embodiments step 810 includes forming an ordered stack of parameter values associated with the hierarchy of nodes.

Figure 9:
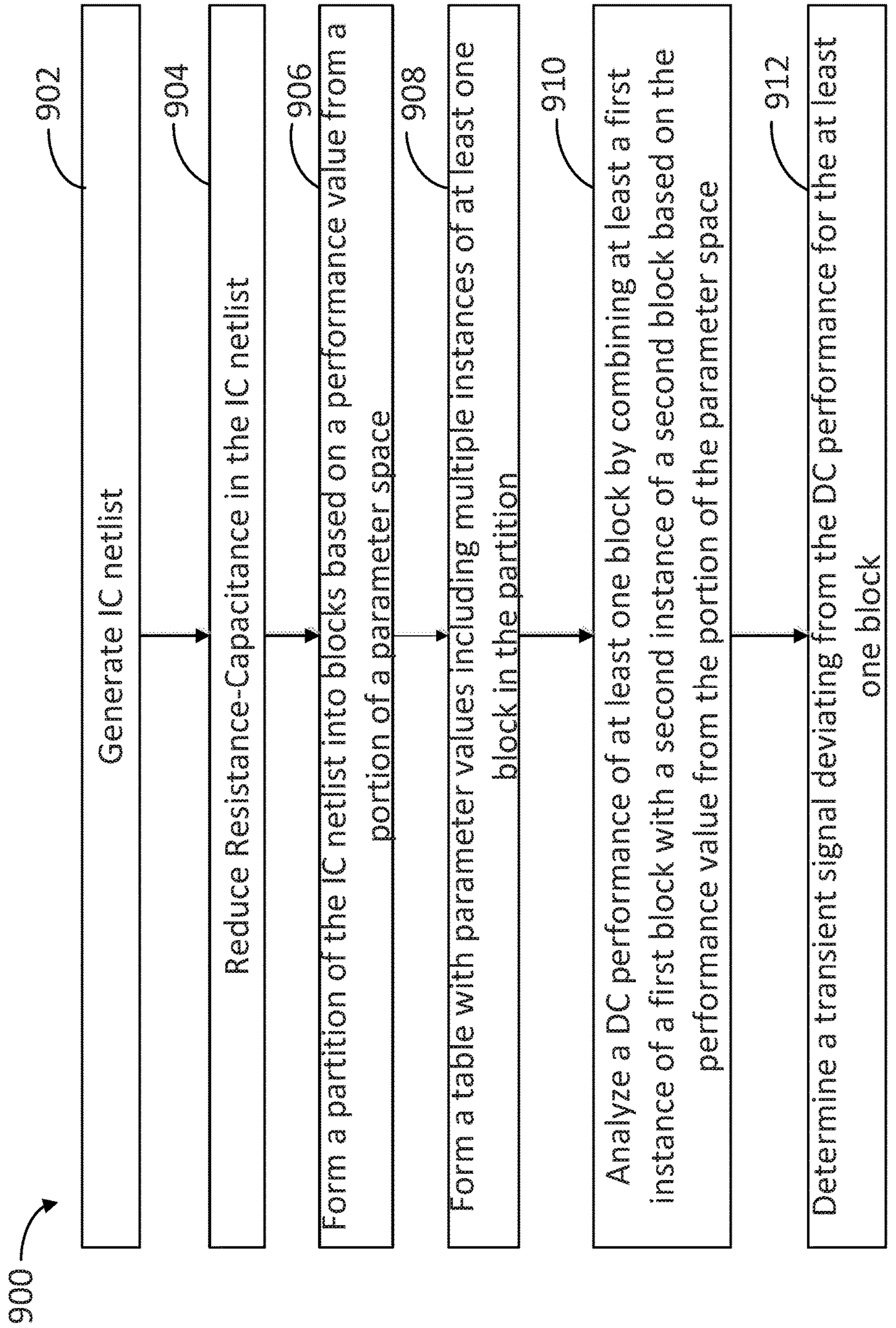
FIG. 9 is a flowchart including steps in a method for IC designing and characterization, according to some embodiments.

FIG. 9 is a flowchart including steps in a method for IC designing and characterization. At least some of the steps in method 900 may be performed by a computer having a processor executing commands stored in a memory of the computer. Further, steps as disclosed in method 900 may include retrieving, editing, and/or storing files in a database that is part of, or is communicably coupled to, the computer. Methods consistent with the present disclosure may include at least some, but not all of the steps illustrated in method 900, performed in a different sequence. Furthermore, methods consistent with the present disclosure may include at least two or more steps as in method 900, performed overlapping in time, or almost simultaneously.

In some embodiments, at least one or more of the steps in method 900 may be performed in cloud computing environment, wherein the computer may include servers, such as a master server and a slave server. Accordingly, at least some of the steps illustrated in method 900 may be performed in parallel in different processors, following separate computational threads. For example, each of the separate computational threads may be performed by at least one of slave servers in each applications and processors dedicated to the specific computational thread. Furthermore, a first processor may partially perform at least one of the steps of method 900 in a first computational thread and a second processor may partially perform at least a second one of the steps of method 900 in a second computational thread.

In some embodiments, methods consistent with method 900 include an IC netlist partitioned into multiple blocks and a database with a stack of memory registers ordered according to a circuit hierarchy (e.g., IC netlists 100, 420 and 520, circuit hierarchy 600, and ordered stack 650). A block, consistent with embodiments disclosed herein, may include an interconnected group of instances (e.g., instances associated with nodes 631, 632, 633, 634 and 635).

Step 902 includes generating the IC netlist. In some embodiments, step 902 may include receiving circuit specifications received from a foundry in a process design kit (PDK).

Step 904 includes reducing a resistance-capacitance in the IC netlist (e.g., resistance-capacitance reduction, RCR) of the IC netlist. In some embodiments, step 904 also includes performing front-end operations with the IC netlist, including binding multiple instances in the IC netlist together, the instance masters, instance connectivity, parameter evaluation, and the like. In some embodiments, step 904 further includes creating a solver database.

Step 906 includes forming a partition of the IC netlist into sub-netlists based on a performance value from at least a parameter space corner. In some embodiments, step 906 includes partitioning the IC netlist according to parameter space corners. In some embodiments, the parameter space corners are selected according to a desired performance value for the IC. For example, in some embodiments step 906 may include selecting a performance value from a portion of a parameter space including a target slew rate or a capacitance loading for an amplifier IC. In some embodiments, step 906 may include selecting a performance value from a portion of a parameter space including a target operational voltage and a target stimulus signal.

In some embodiments, step 906 may include selecting multiple parameter space corners, as these may vary depending on user application, IC design, and the type of simulation desired. In that regard, a simulation involving timing characterization (cf. timing characterization 200A) typically uses more parameter space corners than a simulation involving power characterization (cf. power characterization 200B). For example, a simulation involving timing characterization may include 60+ portions of the parameter space, while a simulation involving power characterization may include fewer portions of the parameter space.

In some embodiments, the selected parameter space corners may include varying PVT conditions. For example, in some simulations step 906 may include selecting between 5-10 PVT parameter space corners, or even more.

Step 908 includes forming a table with parameter values including multiple instances of at least one sub-netlist in the partition. In some embodiments, each table in step 908 is associated with a parameter space corner. In some embodiments, step 908 includes forming the circuit hierarchy including nodes arranged in layers, wherein each node includes at least one instance of one sub-netlist. In some embodiments, step 908 includes forming an ordered stack of memory registers, wherein a first memory register that is stacked below a second memory register stores a first value for a parameter and the second memory register stores a modified value for the parameter, and accessing the modified value for the parameter in the second memory register after accessing the first value of the parameter in the first register.

In some embodiments, step 908 includes creating a database for a simulation of the IC netlist and making the database accessible to multiple nodes in the circuit hierarchy. In some embodiments, step 908 includes creating a persistent database that may be accessed remotely by a plurality of computers processors performing a parallel simulation. In some embodiments, step 908 includes creating the database from the ordered stack, and granting access to the ordered stack to multiple processors (e.g., remotely, through a network in a cloud computing environment).

Step 910 includes performing a DC analysis on at least one sub-netlist of the partition. In some embodiments, step 910 includes determining, with a compiler, a tool mode for analyzing the DC performance of the at least one sub-netlist, based on a memory usage. In some embodiments, step 910 includes performing a Monte-Carlo simulation of the sub-netlist for the performance value in the portion of the parameter space. In some embodiments, step 910 includes further modifying a process, a temperature, and a voltage of operation of the IC.

In some embodiments, step 910 may include performing multiple DC analyses in series or in parallel, using a “fork” command in the compiler to bifurcate a processing thread when two processes that share the same input parameter values may be performed in parallel. Accordingly, step 910 may include performing serial or parallel processing on different computers remotely coupled through a network (e.g., in a cloud computing environment).

In some embodiments, step 910 may include accessing and controlling the IC simulation engine through a command-line interface in the compiler, or an application programming interface (API) installed in a user computer. Moreover, in some embodiments the API may be remotely accessible by multiple users, and provide output analysis packages to report results of the IC simulation process suitably adapted to each user. In some embodiments, the API controls and monitors the IC designing and characterization before, during, and after completion (e.g., in one or all of the steps in method 900).

Step 912 includes determining a transient signal deviating from the DC performance for the at least one sub-netlist. In some embodiments, step 812 includes resolving individual transients for the sub-netlist. In some embodiments, step 812 includes performing a timing characterization of at least one signal, and performing a power characterization of at least one signal.

Figure 10:
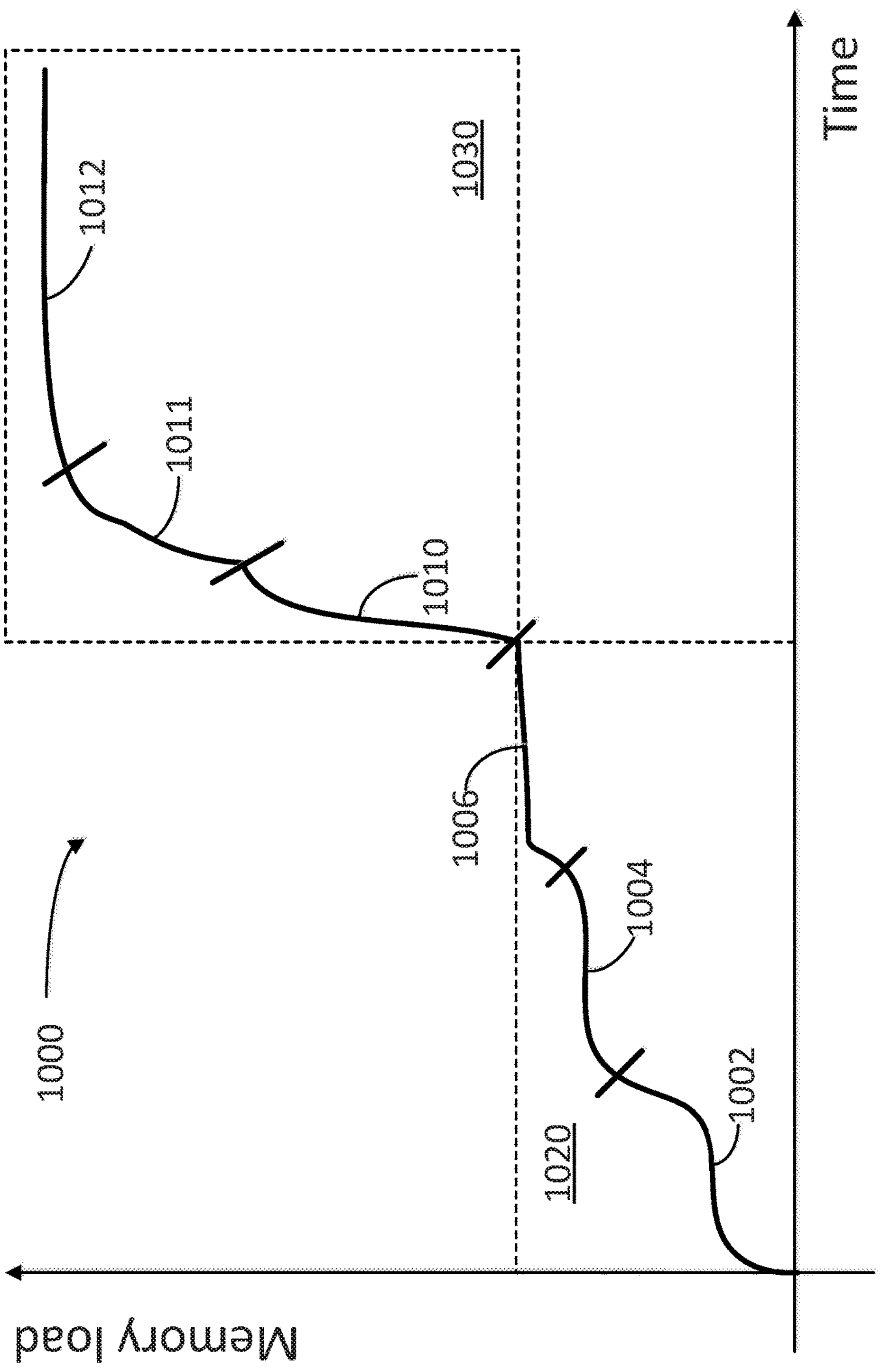
FIG. 10 illustrates a chart of memory usage versus time, according to some embodiments.

FIG. 10 illustrates a chart 1000 of memory usage versus time during an IC simulation process. The abscissae indicate time (X-axis), and the ordinates indicate memory load (e.g., Gygabytes used). Front end stage 1002, RCR stage 904, partition stage 1006, DC Analysis 1010, matrix 1011 (e.g., a solver stage for allocating memory to prepare for transient simulation), transient analysis 1012.

Two distinct regimes may be selected, a first regime 1020 and a second regime 1030. Second regime 1030 includes a steep increase in memory usage in DC analysis stage 1010 and in the matrix stage 1011. It is desirable to reduce the memory load in the simulation engine to free up memory space for other processes, as would be the case in a massive parallel computation process (e.g., in a cloud computing environment). Accordingly, methods consistent with the present disclosure enable the efficient storage of data and parameters such that stage 1020 may be performed in parallel for a higher layer in the circuit hierarchy.

Figure 11:
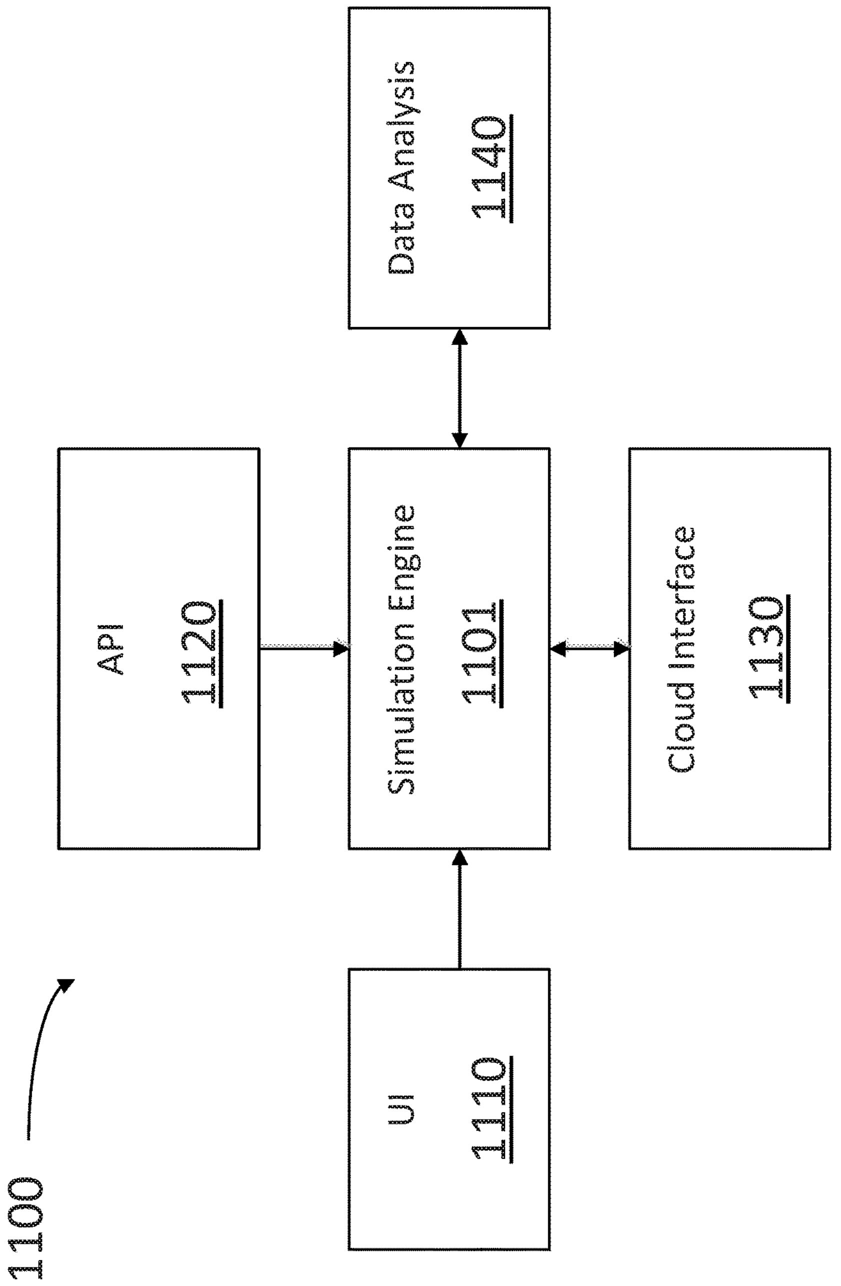
FIG. 11 illustrates exemplary embodiments of a simulation engine, according to some embodiments.

FIG. 11 illustrates exemplary configurations 1100 of a simulation engine 1101, according to some embodiments. A user interface (UI) 1110 may provide user input to simulation engine 1101. In some embodiments, simulation engine 1101 is configured to interact with a cloud interface 1130. In some embodiments, simulation engine 1101 may also provide data and commands and receive data from a data analysis tool 1140 (e.g., for statistical calculations, optimization routines, and the like). An application programming interface 1120 (API) may further provide an operative system environment for the execution of simulation engine 1101, according to the configuration settings of a specific computer running the simulation.

In some embodiments simulation engine 1101 may be called via a command line inside a compiler running in API 1120. Further, in some embodiments simulation engine 1101 may be coupled with a variational analysis tool performing Monte-Carlo simulations to assess IC netlist performance for different portions of the parameter space. Some embodiments configure API 1120 to change the few instances that may use the updated values for the parameters.

Figure 12:
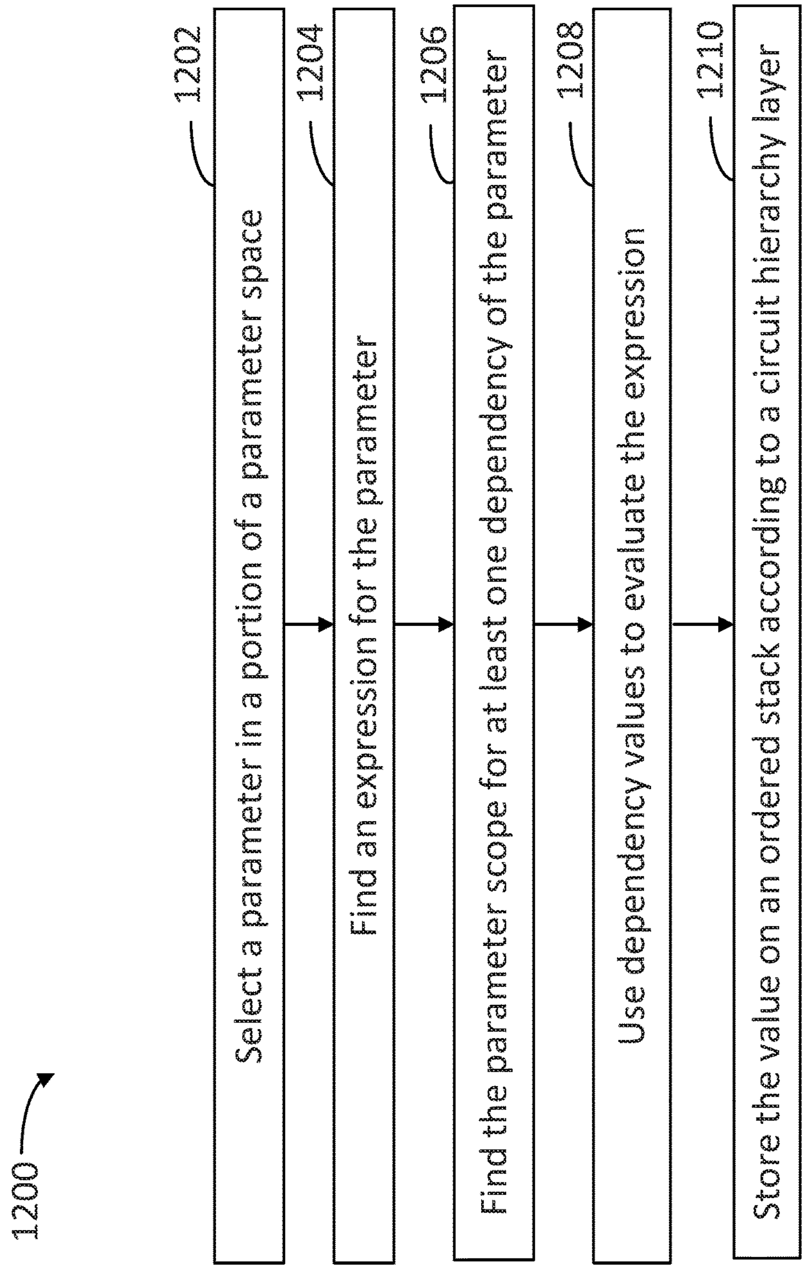
FIG. 12 is a flow chart illustrating steps in a method for simulating an IC netlist including a variable analysis and an on stack evaluation flow, according to some embodiments.

FIG. 12 is a flow chart illustrating steps in a method 1200 for simulating an IC netlist including a variable analysis and an on stack evaluation flow. At least some of the steps in method 1200 may be performed by a computer having a processor executing commands stored in a memory of the computer. Further, steps as disclosed in method 1200 may include retrieving, editing, and/or storing files in a database that is part of, or is communicably coupled to, the computer. Methods consistent with the present disclosure may include at least some, but not all of the steps illustrated in method 1200, performed in a different sequence. Furthermore, methods consistent with the present disclosure may include at least two or more steps as in method 1200, performed overlapping in time, or almost simultaneously.

In some embodiments, at least one or more of the steps in method 1200 may be performed in a cloud computing environment, wherein the computer may include servers, such as a master server and a slave server. Accordingly, at least some of the steps illustrated in method 1200 may be performed in parallel in different processors, following separate computational threads. For example, each of the separate computational threads may be performed by at least one of slave servers in each applications and processors dedicated to the specific computational thread. Furthermore, a first processor may partially perform at least one of the steps of method 1200 in a first computational thread and a second processor may partially perform at least a second one of the steps of method 1200 in a second computational thread.

In some embodiments, methods consistent with method 1200 include an IC netlist partitioned into multiple sub-netlists, and a database with a stack of memory registers ordered according to a circuit hierarchy (e.g., IC netlists 100, 420 and 520, sub-netlists 101, and 220, circuit hierarchy 600, and ordered stack 650).

Step 1202 includes selecting a parameter in a parameter space corner.

Step 1204 includes finding an expression for the parameter.

Step 1206 includes, finding the parameter scope for at least one dependency of the parameter. In some embodiments, step 1206 includes calculating an offset and an index for the parameter based on the scope and a parameter use-identification (UID). Accordingly, in some embodiments step 1206 includes finding the parameter in an ordered stack by matching the layer in the ordered stack with a hierarchy layer of the parameter in a hierarchy tree. In some embodiments, step 1206 includes calculating an offset and an index to pick up a value of the parameter as stored in an ordered stack.

Step 1208 includes using dependency values to evaluate the expression for the parameter. In some embodiments, step 1208 includes filling up the dependency list and call an evaluate routine to evaluate the expression.

Step 1210 includes storing the value for the parameter in an ordered stack according to a circuit hierarchy layer. In some embodiments, step 1210 includes using the scope offset for a netlist parameter and the UID to store the value for the parameter in the proper stack layer associated with the circuit hierarchy layer.

Figure 13:
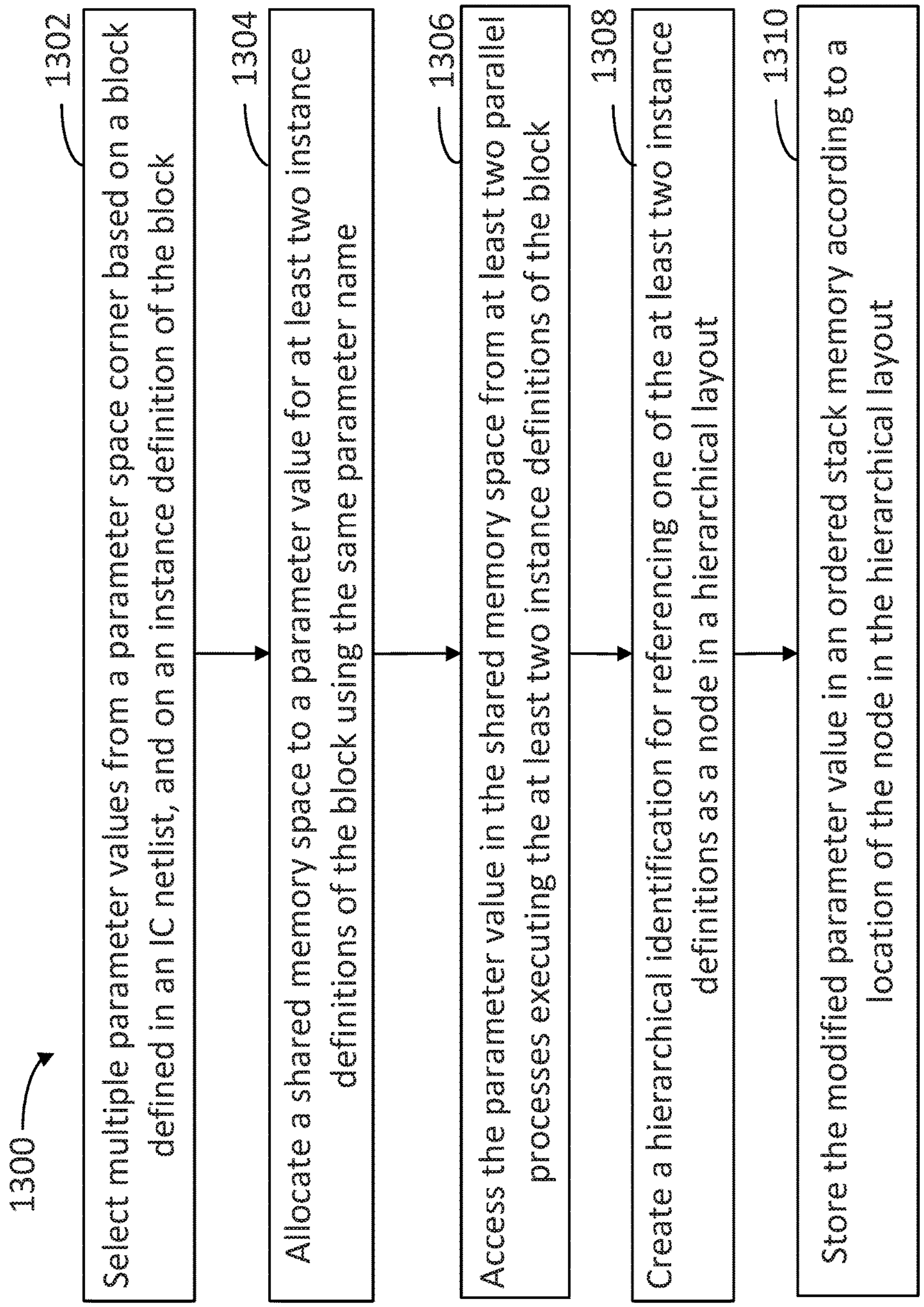
FIG. 13 is a flow chart illustrating steps in a method for simulating an IC netlist including a variable analysis for parallel processing, according to some embodiments.

FIG. 13 is a flow chart illustrating steps in a method 1300 for simulating an IC netlist including a variable analysis for parallel processing, according to some embodiments (e.g., IC netlist 100 and sub-netlists 101). Further, in some embodiments method 1300 includes using a hierarchical layout of multiple instances for different sub-netlists of the IC netlist, the hierarchical layout associated with an ordered stack memory (e.g., circuit hierarchy 600 and ordered stack 650). At least some of the steps in method 1300 may be performed by a computer having a processor executing commands stored in a memory of the computer. Further, steps as disclosed in method 1300 may include retrieving, editing, and/or storing files in a database that is part of, or is communicably coupled to, the computer. Methods consistent with the present disclosure may include at least some, but not all of the steps illustrated in method 1300, performed in a different sequence. Furthermore, methods consistent with the present disclosure may include at least two or more steps as in method 1300, performed overlapping in time, or almost simultaneously.

In some embodiments, at least one or more of the steps in method 1300 may be performed in a cloud computing environment, wherein the computer may include servers, such as a master server and a slave server. Accordingly, at least some of the steps illustrated in method 1300 may be performed in parallel in different processors, following separate computational threads. For example, each of the separate computational threads may be performed by at least one of slave servers in each applications and processors dedicated to the specific computational thread. Furthermore, a first processor may partially perform at least one of the steps of method 1300 in a first computational thread and a second processor may partially perform at least a second one of the steps of method 1300 in a second computational thread.

Step 1302 includes selecting multiple parameter values from a parameter space corner based on a sub-netlist defined in the IC netlist, on an instance definition of the sub-netlist. In some embodiments, step 1302 includes forming a table of parameter values associated with the node in the hierarchical layout. In some embodiments, the instance definition of the sub-netlist in step 1302 includes performing a Monte-Carlo simulation of the sub-netlist for the parameter value in the portion of the parameter space. In some embodiments, step 1302 includes modifying a process, a temperature, and a voltage of operation of the sub-netlist.

Step 1304 includes allocating a shared memory space to a parameter value for at least two instance definitions of the sub-netlist using the same parameter name. In some embodiments, step 1304 includes selecting the shared memory space in a cloud computing environment. In some embodiments, step 1304 includes leveraging a distribution of processes in an IC simulation over multiple processors in a cloud computing environment.

Step 1306 includes accessing the parameter value in the shared memory space from at least two parallel processes executing the at least two instance definitions of the sub-netlist. In some embodiments, step 1306 includes executing the at least two parallel processes on separate processors. In some embodiments, step 1306 includes determining a transient signal in a timing characterization of the sub-netlist or in a power characterization of the sub-netlist. In some embodiments, step 1306 includes performing a variation analysis over the parameter space corner to capture the manufacture variability impact on the IC design. Accordingly, step 1306 may include performing a variation analysis or a Monte Carlo simulation in timing and power characterization flows.

Step 1308 includes creating a hierarchical identification for referencing one of the at least two instance definitions as a node in the hierarchical layout.

Step 1310 includes storing the modified parameter value in an order memory stack according to the location of the node in the hierarchical layout. In some embodiments, step 1310 includes storing a persistent parameter value according to an identification of an instance definition where the parameter value was modified in the hierarchical layout.

Figure 14:
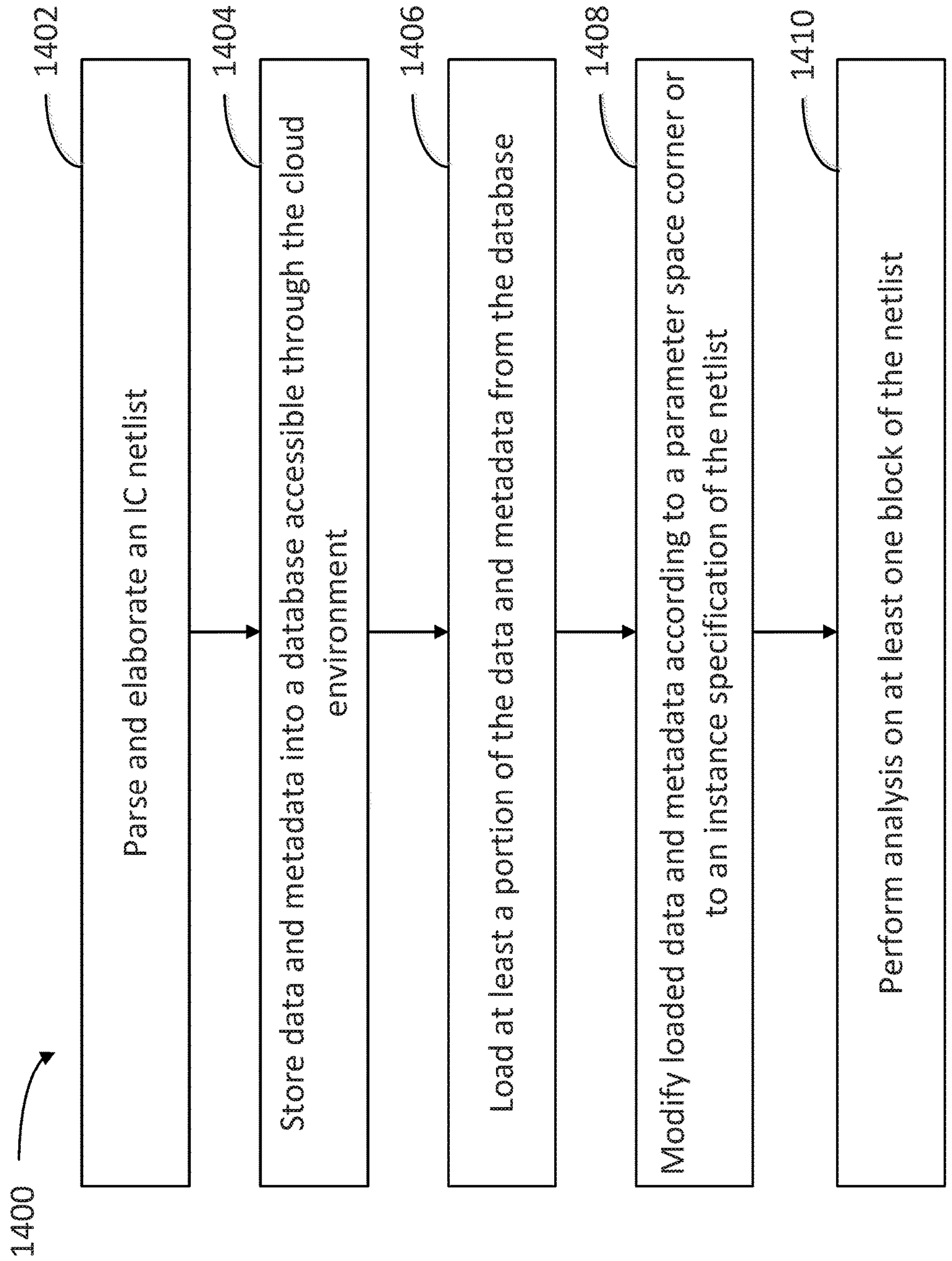
FIG. 14 is a flow chart illustrating steps in a method for simulating an IC netlist including a shared persistent memory for parallel processing in a cloud computing environment, according to some embodiments

FIG. 14 is a flow chart illustrating steps in a method 1400 for simulating an IC netlist including a shared persistent memory for parallel processing, according to some embodiments. (e.g., IC netlist 100 and sub-netlists 101). In some embodiments, method 1400 includes using a hierarchical layout of multiple instances for different sub-netlists of the IC netlist, the hierarchical layout associated with an ordered stack memory (e.g., circuit hierarchy 600 and ordered stack 650). At least some of the steps in method 1400 may be performed by a computer having a processor executing commands stored in a memory of the computer. Further, steps as disclosed in method 1400 may include retrieving, editing, and/or storing files in a database that is part of, or is communicably coupled to, the computer. Methods consistent with the present disclosure may include at least some, but not all of the steps illustrated in method 1400, performed in a different sequence. Furthermore, methods consistent with the present disclosure may include at least two or more steps as in method 1300, performed overlapping in time, or almost simultaneously.

In some embodiments, at least one or more of the steps in method 1400 may be performed in a cloud computing environment, wherein the computer may include servers, such as a master server and a slave server. Accordingly, at least some of the steps illustrated in method 1400 may be performed in parallel in different processors, following separate computational threads. For example, each of the separate computational threads may be performed by at least one of slave servers in each applications and processors dedicated to the specific computational thread. Furthermore, a first processor may partially perform at least one of the steps of method 1400 in a first computational thread and a second processor may partially perform at least a second one of the steps of method 1400 in a second computational thread.

Step 1402 includes parsing and reading the IC netlist into memory. In some embodiments, step 1402 may include elaborating the IC netlist. Step 1402 may also include preparing a table including parameter values selected from a parameter space corner, and performing an RCR step on the IC netlist. Further, in some embodiments step 1402 may include partitioning the IC netlists into sub-netlists, and performing a DC analysis for at least one of the sub-netlists. Step 1402 may also include creating data and metadata associated with the parsing the IC netlist, the table including parameters, the RCR step, the partitions in the IC netlist, and the DC analysis on the at least one sub-netlist. In some embodiments, step 1402 includes forming a table of parameter values associated with a node in a hierarchical layout associated with the at least one block in the IC netlist.

Step 1404 includes storing the data and metadata resulting from step 1402 into a database accessible through the cloud environment. In some embodiments, step 1404 includes storing data and metadata from the DC analysis, or a table prepared in step 1402.

Step 1406 includes loading to a processor at least a portion of the data and metadata from the database. In some embodiments, step 1406 may include loading the data and metadata from a second processor (e.g., from a second computer) in the cloud computing environment, at a different simulation stage of the IC netlist.

Step 1408 includes modifying the loaded data and metadata according to a parameter space corner. In some embodiments, step 1408 includes editing the loaded data and metadata according to an instance specification of the netlist. Further, in some embodiments step 1408 includes editing the loaded data and metadata according to a PVT condition specified for the IC netlist.

Step 1410 includes performing an analysis on at least one block of the netlist. In some embodiments, step 1410 includes performing the analysis on a sub-netlist or sub circuit of the IC netlist. Further, in some embodiments step 1410 includes performing at least one of a transient analysis, a DC analysis, an alternate-current (AC) analysis, or a noise characterization analysis on the at least one block of the netlist. In some embodiments, step 1410 includes performing a Monte-Carlo simulation of the at least one block using the data or the metadata that is loaded in the processor. In some embodiments, step 1410 includes leveraging a distribution of processes in an IC simulation over multiple processors in the cloud computing environment.

In some embodiments, method 1400 may further include selecting a shared memory space for the database in the cloud computing environment, and establishing a secured access protocol for the shared memory space. In some embodiments, method 1400 may further include loading to a second processor the at least one of the data value or the metadata from the database and performing a second analysis on a second instance of the at least one block of the IC using the data or the metadata loaded in the second processor.

In some embodiments, steps 1402 and 1404 may be performed within a first regime of an IC simulation process (e.g., regime 1020), and steps 1406, 1408 and 1410 may be performed within a second regime of the IC simulation process (e.g. regime 1030). For example, in some embodiments storing the data value in the database is performed in a first computer from the cloud computing environment and loading to a processor the data value or the metadata from the database is performed in a second computer from the cloud computing environment. Accordingly, the data persistency in the database enables the second regime to take place in parallel in separate processors from the cloud computing environment, thereby reducing the memory allocation of resources for at least the separate processors. Accordingly, in addition to the benefit of efficient parallel processing, embodiments consistent with the present disclosure provide a relief of memory resources in the cloud computing environment, allowing multiple processors to use the available resources in other processes.

Figure 15:
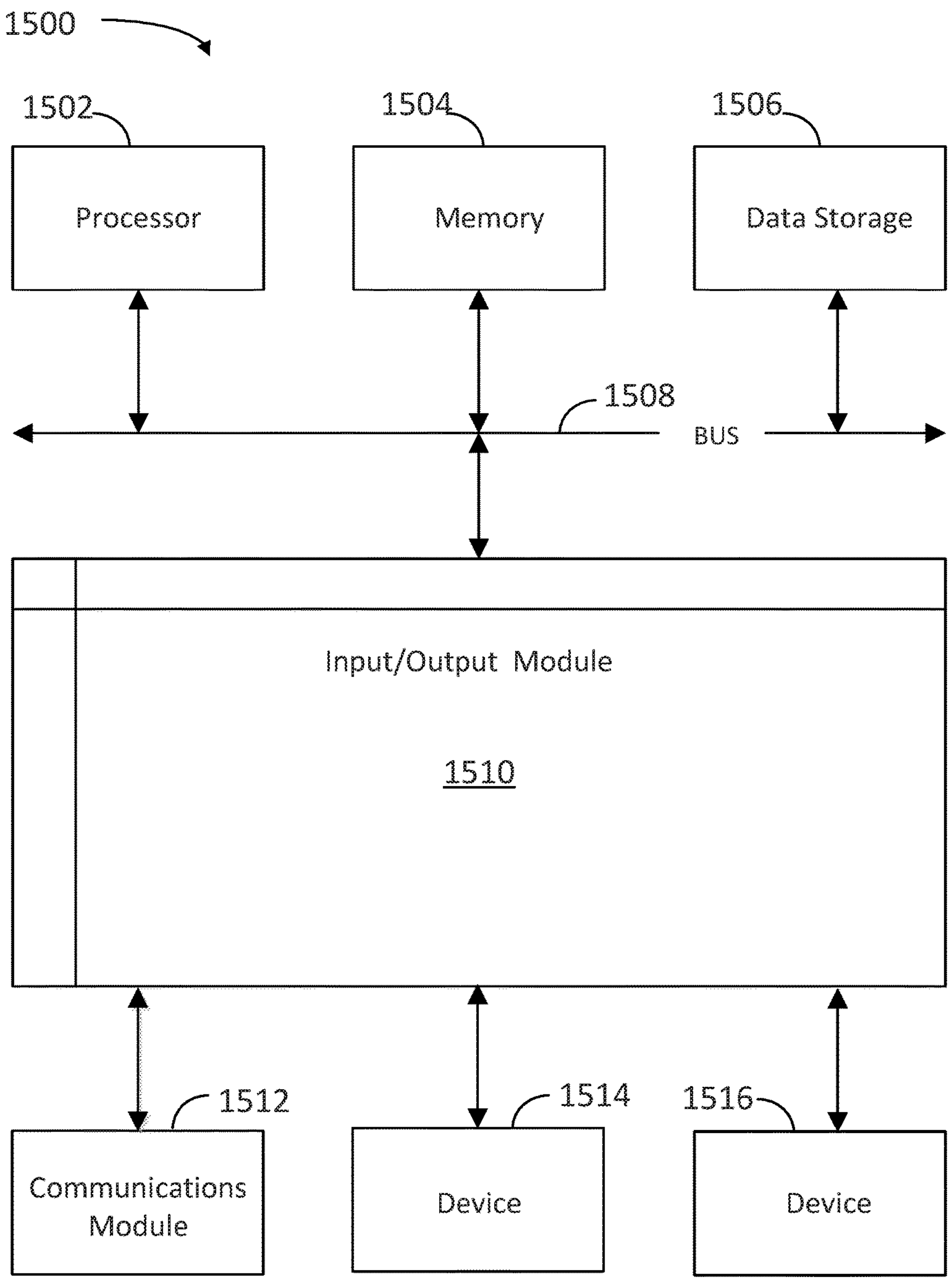
FIG. 15 is a block diagram illustrating an example computer system that includes a design tool, according to some embodiments.

FIG. 15 is a block diagram illustrating an example computer system 1500 with which the methods and steps illustrated in FIGS. 7, 8, 9, and 12-14 can be implemented, according to some embodiments. In certain aspects, computer system 1500 can be implemented using hardware or a combination of software and hardware, either in a dedicated server, integrated into another entity, or distributed across multiple entities.

Computer system 1500 includes a bus 1508 or other communication mechanism for communicating information, and a processor 1502 coupled with bus 1508 for processing information. By way of example, computer system 1500 can be implemented with one or more processors 1502. Processor 1502 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 1502 may include modules and circuits configured as a 'placing' tool or engine, or a 'routing' tool or engine, to place devices and route channels in a circuit layout, respectively and as disclosed herein.

Computer system 1500 includes, in addition to hardware, code that creates an execution environment for the computer program in question, e.g., code that constitutes processor firmware, a protocol stack, a database management system, an operating system, or a combination of one or more of them stored in an included memory 1504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1508 for storing information and instructions to be executed by processor 1502. Processor 1502 and memory 1504 can be supplemented by, or incorporated in, special purpose logic circuitry.

The instructions may be stored in memory 1504 and implemented in one or more computer program products, e.g., one or more modules of computer program instructions encoded on a computer readable medium for execution by, or to control the operation of, the computer system 1500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 1504 may also be used for storing temporary variable or other intermediate information during execution of instructions to be executed by processor 1502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1500 further includes a data storage device 1506 such as a magnetic disk or optical disk, coupled to bus 1508 for storing information and instructions.

Computer system 1500 is coupled via input/output module 1510 to various devices. The input/output module 1510 is any input/output module. Example input/output modules 1510 include data ports such as USB ports. The input/output module 1510 is configured to connect to a communications module 1512. Example communications modules 1512 include networking interface cards, such as Ethernet cards and modems. In certain aspects, the input/output module 1510 is configured to connect to a plurality of devices, such as an input device 1514 and/or an output device 1516. Example input devices 1514 include a keyboard and a pointing device, e.g., a mouse or a trackball, by which a user can provide input to the computer system 1500. Other kinds of input devices 1514 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 1516 include display devices, such as a LED (light emitting diode), CRT (cathode ray tube), or LCD (liquid crystal display) screen, for displaying information to the user.

Methods as disclosed herein may be performed by computer system 1500 in response to processor 1502 executing one or more sequences of one or more instructions contained in memory 1504. Such instructions may be read into memory 1504 from another machine-readable medium, such as data storage device 1506. Execution of the sequences of instructions contained in main memory 1504 causes processor 1502 to perform the process steps described herein (e.g., as in methods 700-900 and 1200-1400). One or more processors in a multi-processing arrangement may also be employed to execute the sequences of instructions contained in memory 1504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., communication network 150. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 1500 includes servers and personal computer devices. A personal computing device and server are generally remote from each other and typically interact through a communication network. The relationship of client and server arises by virtue of computer programs running on the respective computers and having a client-server relationship to each other. Computer system 1500 can be, for example, and without limitation, a desktop computer, laptop computer, or tablet computer. Computer system 1500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 1502 for execution. Such a medium may take many forms, including, but not limited to, non-volatile media, volatile media, and transmission media. Non-volatile media include, for example, optical disks, magnetic disks, or flash memory, such as data storage device 1506. Volatile media include dynamic memory, such as memory 1504. Transmission media include coaxial cables, copper wire, and fiber optics, including the wires that comprise bus 1508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some," refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A computer-implemented method for simulating an integrated circuit (IC) design, comprising:

parsing an IC netlist and loading the IC netlist into memory;

forming a table model including parameter values for at least one circuit component in the IC netlist, the parameter values selected from a portion of a parameter space;

storing, from a first processor in a cloud computing environment upon completion of a first simulation stage, a data value associated with the parsing of the IC netlist and the table model in a first register of an ordered parameter stack of a database accessible through the cloud computing environment, the data value comprising a metadata associated with the data value;

loading, to a second processor at a second simulation stage, at least one of the data value or the metadata from the database;

modifying the data value or the metadata that is loaded in the second processor, according to the portion of the parameter space;

storing the data value in a second register of the ordered parameter stack in the database; and performing an analysis on at least one block of the IC netlist according to the data value or the metadata that is loaded in the second processor, wherein the first register and the second register are accessed from different nodes of a hierarchical layout for the IC netlist.

2. The computer-implemented method of claim 1, wherein parsing the IC netlist further comprises reducing a resistance-capacitance of the IC netlist, and the storing the data value comprises storing a data value associated with reducing a resistance-capacitance of the IC netlist.

3. The computer-implemented method of claim 1, wherein forming a table model including parameter values for at least one circuit component from a portion of a parameter space comprises forming a table of parameter values associated with a node in the hierarchical layout for the IC netlist.

4. The computer-implemented method of claim 1, wherein the first processor is located in a first computer from the cloud computing environment and the second processor is located in a second computer from the cloud computing environment.

5. The computer-implemented method of claim 1, wherein modifying the data or the metadata that is loaded in the second processor further comprises modifying a process, a temperature, and a voltage of operation of the at least one block.

6. The computer-implemented method of claim 1, wherein performing an analysis on at least one block of the IC netlist comprises performing a Monte-Carlo simulation of the at least one block using the data or the metadata that is loaded in the second processor.

7. The computer-implemented method of claim 1, wherein performing an analysis on at least one block of the IC netlist comprises leveraging a distribution of processes in an IC simulation over multiple processors in the cloud computing environment.

8. The computer-implemented method of claim 1, further comprising selecting a shared memory space for the database in the cloud computing environment, and establishing a secured access protocol for the shared memory space.

9. The computer-implemented method of claim 1, further comprising loading to a second processor the at least one of the data value or the metadata from the database and performing a second analysis on a second instance of the at least one block of the IC using the data or the metadata loaded in the second processor.

10. A system, comprising:

a memory, storing instructions; and at least one processor that executes the instructions to:

parse an IC netlist and loading the IC netlist into memory;

form a table model including parameter values for at least one circuit component in the IC netlist, the parameter values selected from a portion of a parameter space;

store, from a first processor in a cloud computing environment upon completion of a first simulation stage, a data value associated with the IC netlist and the table model in a first register of an ordered parameter stack of a database accessible through the cloud computing environment, the data value comprising a metadata associated with the data value;

load, to a second processor at a second simulation stage, at least one of the data value or the metadata from the database;

modify the data value or the metadata that is loaded in the second processor, according to the portion of the parameter space;

store the data value in a second register of the ordered parameter stack in the database; and perform an analysis on at least one block of the IC netlist according to the data value or the metadata that is loaded in the second processor, wherein the first simulation stage and the second simulation stage belong in different nodes of a hierarchical layout for the IC netlist.

11. The system of claim 10, wherein to parse the IC netlist the at least one processor further executes instructions to reduce a resistance-capacitance of the IC netlist, and to store the data value the at least one processor further executes instructions to store a data value associated with reducing a resistance-capacitance of the IC netlist.

12. The system of claim 10, wherein to form a table model including parameter values for at least one circuit component from a portion of a parameter space the at least one processor executes instructions to form a table of parameter values associated with a node in the hierarchical layout for the IC netlist.

13. The system of claim 10, wherein the at least one processor instructs a first processor in a first computer from the cloud computing environment to store the data value or the metadata in the database, and the at least one processor instructs a second processor in a second computer from the cloud computing environment to load to a processor the data value or the metadata from the database.

14. The system of claim 10, wherein to modify the data or the metadata that is loaded in the processor the at least one processor executes instructions to modify a process, a temperature, and a voltage of operation of the at least one block.

15. The system of claim 10, wherein to perform an analysis on at least one block of the IC netlist the at least one processor executes instructions to perform a Monte-Carlo simulation of the at least one block using the data or the metadata that is loaded in the processor.

16. The system of claim 10, wherein to perform an analysis on at least one block of the IC netlist the at least one processor executes instructions to leverage a distribution of processes in an IC simulation over multiple processors in the cloud computing environment.

17. A non-transitory, machine-readable medium comprising instructions stored in a memory which, when executed by a processor, cause a computer to perform a method, the method comprising:

parsing an IC netlist and loading the IC netlist into memory;

forming a table model including parameter values for at least one circuit component in the IC netlist, the parameter values selected from a portion of a parameter space;

storing, from a first processor in a cloud computing environment upon completion of a first simulation stage, a data value associated with the parsing of the IC netlist and the table model in a first register of an ordered parameter stack of a database accessible through the cloud computing environment, the data value comprising a metadata associated with the data value;

loading, to a second processor, at least one of the data value or the metadata from the database;

modifying the data value or the metadata that is loaded in the second processor, according to the portion of the parameter space;

storing the data value in a second register of the ordered parameter stack in the database; and performing an analysis on at least one block of the IC netlist according to the data value or the metadata that is loaded in the second processor, wherein the first register and the second register are accessed from different nodes of a hierarchical layout for the IC netlist.

18. The non-transitory, machine-readable medium of claim 17 wherein, in the method, parsing the IC netlist further comprises reducing a resistance-capacitance of the IC netlist, and the storing the data value comprises storing a data value associated with reducing a resistance-capacitance of the IC netlist.

19. The non-transitory, machine-readable medium of claim 17 wherein, in the method, forming a table model including parameter values for at least one circuit component from a portion of a parameter space comprises forming a table of parameter values associated with a node in the hierarchical layout for the IC netlist.

20. The non-transitory, machine-readable medium of claim 17 wherein, in the method, storing the data value or the metadata in the database is performed in a first computer from the cloud computing environment and the loading to a processor the data value or the metadata from the database is performed in a second computer from the cloud computing environment.

* * * * *